(12) United States Patent
Mason et al.

(10) Patent No.: US 7,584,128 B2
(45) Date of Patent: Sep. 1, 2009

(54) VALIDATING NEGOTIABLE DOCUMENTS USING PUBLIC DOCUMENT VALIDATION PROFILES

(75) Inventors: James G. Mason, Alameda, CA (US); Gilles F. Houle, Walnut Creek, CA (US)

(73) Assignee: Kappa Image LLC, Oakland, CA (US)

( * ) Notice: Subject to any disclaimer, the term of this patent is extended or adjusted under 35 U.S.C. 154(b) by 20 days.

(21) Appl. No.: 11/207,464

(22) Filed: Aug. 18, 2005

(65) Prior Publication Data

US 2006/0041506 A1 Feb. 23, 2006

Related U.S. Application Data

(60) Provisional application No. 60/602,414, filed on Aug. 18, 2004.

(51) Int. Cl.
*G06Q 40/00* (2006.01)
*G06K 9/18* (2006.01)

(52) U.S. Cl. .............................. 705/35; 705/75; 382/137

(58) Field of Classification Search ................. 382/135, 382/232, 137–140; 705/35, 39–45, 75–77; 713/168, 175–180; 380/28–30
See application file for complete search history.

(56) References Cited

U.S. PATENT DOCUMENTS

| | | | | | |
|---|---|---|---|---|---|
| 3,699,517 | A | * | 10/1972 | Dyche | ........................ 382/122 |
| 5,748,780 | A | * | 5/1998 | Stolfo | ........................ 382/232 |
| 6,195,452 | B1 | * | 2/2001 | Royer | ........................ 382/135 |
| 2001/0002485 | A1 | * | 5/2001 | Bisbee et al. | ............... 713/167 |
| 2004/0218801 | A1 | | 11/2004 | Houle | |
| 2004/0223637 | A1 | | 11/2004 | Houle | |
| 2004/0228513 | A1 | | 11/2004 | Houle | |
| 2004/0228514 | A1 | | 11/2004 | Houle | |
| 2004/0237047 | A1 | | 11/2004 | Houle | |
| 2005/0096992 | A1 | * | 5/2005 | Geisel et al. | ................... 705/24 |
| 2006/0041506 | A1 | | 2/2006 | Mason | |
| 2007/0110311 | A1 | | 5/2007 | Houle | |
| 2007/0110312 | A1 | | 5/2007 | Houle | |
| 2007/0110313 | A1 | | 5/2007 | Houle | |
| 2007/0110314 | A1 | | 5/2007 | Houle | |

OTHER PUBLICATIONS

No Author, Defense Against Stolen and Counterfiet Checks, Teller Vision (Bureau of Better Business) Oct. 15, 2000, Issue 1264, p. 3-4.*

(Continued)

*Primary Examiner*—Mary Cheung
(74) *Attorney, Agent, or Firm*—Morgan, Lewis & Bockius LLP

(57) ABSTRACT

A system and method that allows a business or financial institution accepting negotiable documents such as checks as payments or receiving such documents in deposits to determine whether those documents are valid by comparing a set of document and maker characteristics extracted from an image of the document to the document and maker characteristics for valid documents stored in a profile. These characteristics are contained in a public document validation profile. The public document validation profile does not require the distribution of information subject to privacy laws and regulations and does not expose information of potential use to fraud perpetrators.

18 Claims, 16 Drawing Sheets

OTHER PUBLICATIONS

No Author, Defense Against Stolen and Counterfiet Checks, Teller Vision (Bureau of Better Business) Oct. 15, 2000, Issue 1264, p. 3-4).*

Defense Against Stolen and Counterfeit Checks, Teller Vision, Oct. 15, 2000 Issue 1264, p. 3, 2p; (AN 6759638).

PCT International Search Report and the Written Opinion of the International Searching Authority, or the Declaration PCT/US05/29723, Mailed on Nov. 16, 2007.

* cited by examiner

VALIDATING NEGOTIABLE DOCUMENTS USING PUBLIC DOCUMENT VALIDATION PROFILES

STATEMENT OF RELATED CASES

This application claims the benefit of U.S. Provisional Application No. 60/602,414 filed on Aug. 18, 2004.

BACKGROUND OF THE INVENTION

1. Field of the Invention

This invention relates to a system and method for analyzing document images to determine whether negotiable documents including, but not limited to checks, money orders, or giros (check-like negotiable documents commonly used in European countries), presented to be cashed, proffered as payments, or deposited to accounts in financial institutions are fully negotiable and valid.

2. Background

Increasingly, business entities are replacing the exchange of negotiable documents in paper form with the exchange of images of those documents and the delivery of a document image itself constitutes an event that triggers a value exchange. For instance, banks in the United States are in the process of moving to image exchange for checks. In a check image exchange, the receipt of an image of a check drawn from an account at a bank will cause the amount of value identified in the check to be debited from the account. An important topic in the exchange of any negotiable document is how to make sure that all participants in the exchange are able to determine the validity of the negotiable document. A valid negotiable document requires that all of the information required for negotiability is present and readable, the document itself is not a counterfeit and is not forged or altered. All participants in a reliable image exchange environment need to have the capability to determine the validity of a negotiable document by examining only the image of the document since the paper copy of the document itself is not available for examination.

In the banking industry, a check image is deemed as a "usable" image if all the information required for negotiability is both present and readable from the image, and the process for determining whether the information is present and readable is commonly known as "image usability" analysis.

A recurring issue with the use of image exchange by the banking industry is check fraud. Individuals, businesses and financial institutions lose over $1 billion annually due to check fraud. Common methods of perpetrating check fraud include:

- making counterfeit checks (the check stock for the fraudulent check is not the valid check stock for the account);
- forging checks (the check writer is not one of the people authorized to write checks on the account); and
- altering legitimate checks (some writing on the check has been changed in a way not authorized by a person authorized to write checks on the account)

In attempting to limit check fraud losses and for other check processing purposes, businesses and financial institutions have developed a complex network of business relationships and organizations with specialized roles as well as a supporting technology infrastructure. These businesses and financial institutions include:

- account holding financial institutions providing checking accounts of various types;
- depository financial institutions accepting deposits consisting of checks drawn on their own accounts as well as accounts provided by other financial institutions;
- retailers and merchants accepting checks as payment for products or services;
- check guarantee companies offering check guarantee services to businesses that accept checks as a payment method by charging a fee. The check guarantee company reimburses the check accepting business if the financial institution on which it is drawn does not pay a guaranteed check;
- check cashing service companies offering cash for checks and money orders for a fee; and
- account information distribution companies distributing the information on accounts (such as account open/closed status, stop payment information on individual checks, etc) that financial institutions are allowed to share with third parties without violating privacy laws and regulations.

FIG. 1 depicts conventional methods of handling fraudulent checks deposited by bank customers. A bank customer 154 deposits a check 156 drawn on an account holding financial institution 166 into an account at a depository financial institution 158. The depository financial institution 158 sends the check 156 to a check clearing organization 162 to determine the identity of the account holding financial institution 166. The check clearing organization 162 sends the check 156 to the account holding financial institution 166. If the account holding financial institution 166 determines that the check 156 is fraudulent, it returns the check 156 to the check clearing organization 162. The check clearing organization 162 then returns the check 156 to the depository financial institution 158. The depository financial institution 158 then reverses the deposit of check 156 and returns check 156 to the bank customer 154.

As another example, FIG. 2 depicts conventional methods of handling fraudulent checks used to make payments to retailers or merchants. A retail customer 174 presents a check 156 to a retailer or merchant 178. The retailer or merchant 178 generates a check guarantee request 208 for check 156 and submits the request to a check guarantee company 212. Upon receipt of the request 208, the check guarantee company 212 examines its internal files and account status information 200 provided by account information distribution companies 202. Account information distribution companies 202 obtain account status information 200 from account holding financial institutions 166. If no adverse information is found, the check guarantee company 212 gives an affirmative check guarantee decision 210 for the check 156 to the retailer or merchant 178. An affirmative check guarantee decision 210 obligates the check guarantee company 212 to reimburse the retailer or merchant 178 in the event that check 156 turns out to be fraudulent. Assured by the affirmative check guarantee decision 210, the retailer or merchant 178 deposits the check 156 in a depository financial institution 158.

If the check 156 is drawn on a different financial institution, depository financial institution 158 sends the check 156 to a check clearing organization 162. The check clearing organization 162 determines the identity of the account holding financial institution 166 and sends the check 156 to the account holding financial institution 166. If the account holding financial institution 166 determines that the check 156 is fraudulent, the account holding financial institution 166 returns the check 156 to the check clearing organization 162. The check clearing organization 162 returns the check 156 to the depository financial institution 158. The depository financial institution 158 then reverses the deposit of check 156 and returns check 156 to the retailer or merchant 178. If this ever happens, the retailer or merchant 178 may seek reimbursement from the check guarantee company 212 based on the agreement it has with the check guarantee company 212.

Despite this complex network of businesses and supporting technology, check fraud still occurs for various reasons. For example, financial institutions receiving, as deposits, checks drawn on other financial institutions or businesses accepting checks as payments have few methods of determining whether the checks are legitimate checks (not counterfeits) and whether the checks were written by an authorized person (not forged or altered). In addition, when a fraud check is presented to a check cashing service or used for merchandise payment, current fraud detection methods are not very helpful since the fraud is often detected after the value exchange has already taken place.

Although the account holding financial institution has the information to validate checks drawn on its accounts, it currently has no appropriate way to make such information available to other financial institutions or businesses that need to validate checks drawn on the account holding financial institution. Even if the account holding institution had a way to make such information available, it is precluded from doing so because such information is often protected from being released to third parties by privacy laws and regulations.

Even if there is no violation of privacy laws and regulations, the transmission of such information in its current form as being held and disclosed by the account holding financial institution may expose the financial institution and the account holder to greater fraud risk. For example, the interception of such information could enable a fraud perpetrator to make counterfeit and/or forged checks with a higher likelihood of being accepted as legitimate ones.

In addition, significant time is required to transmit checks or check images from the point of presentment at a retailer or at a depository financial institution to the account holding financial institution. As a result, there is often a delay of several days between the time that fraud is perpetrated and the time that the account holding financial institution becomes aware of the fraudulent activity.

Accordingly, there is a strong need to develop an efficient system and method for determining whether checks accepted as payments or deposits are valid without violating privacy laws and regulations or exposing any private information to potential fraud perpetrators.

SUMMARY

This invention, therefore, provides for a system and method for determining whether a check is valid by comparing a set of characteristics extracted from an image of the check to a corresponding set of characteristics associated with valid checks for the same account on which the check is drawn. The latter set of characteristics is contained in a public check validation profile associated with the account. The invention makes use of the existing check-processing network of business relationships and organizations with specialized roles as well as its supporting infrastructure to create, distribute, and utilize the public check validation profile.

More specifically, a public check validation profile comprises a relatively small (5,000 bytes or smaller) mathematical representation of the characteristics of valid checks drawn on an account, which is far less than a conventional profile (20,000 bytes or larger) consisting of actual image samples. A small profile size makes it practical to distribute the public check validation profile to many sites and to transmit them over existing industry communications facilities. The characteristics extracted from the image of a check presented for payment or included in a deposit are compared with the characteristics in the public check validation profile to determine the validity of the check. In some embodiments, the size of the set of characteristics extracted from a check image is less than 1,000 bytes. The public check validation profile does not contain any information that would assist anyone in creating counterfeit or forged checks. Nor does the public check validation profile contain any information subject to privacy laws and regulations' protection.

This invention can be implemented at any location where the comparison of the characteristics of checks and the characteristics stored in the public check validation profile occurs. When the comparison location is different from the location at which the check is presented, this invention provides a means of transmitting data required for making the comparison without exposing any private information or information of use to fraud perpetrators.

DESCRIPTION OF THE DRAWINGS

The aforementioned aspects of the invention as well as additional aspects will be more clearly understood as a result of the following detailed description of the various embodiments of the invention when taken in conjunction with the drawings.

DESCRIPTION OF EMBODIMENTS

Figure 1:
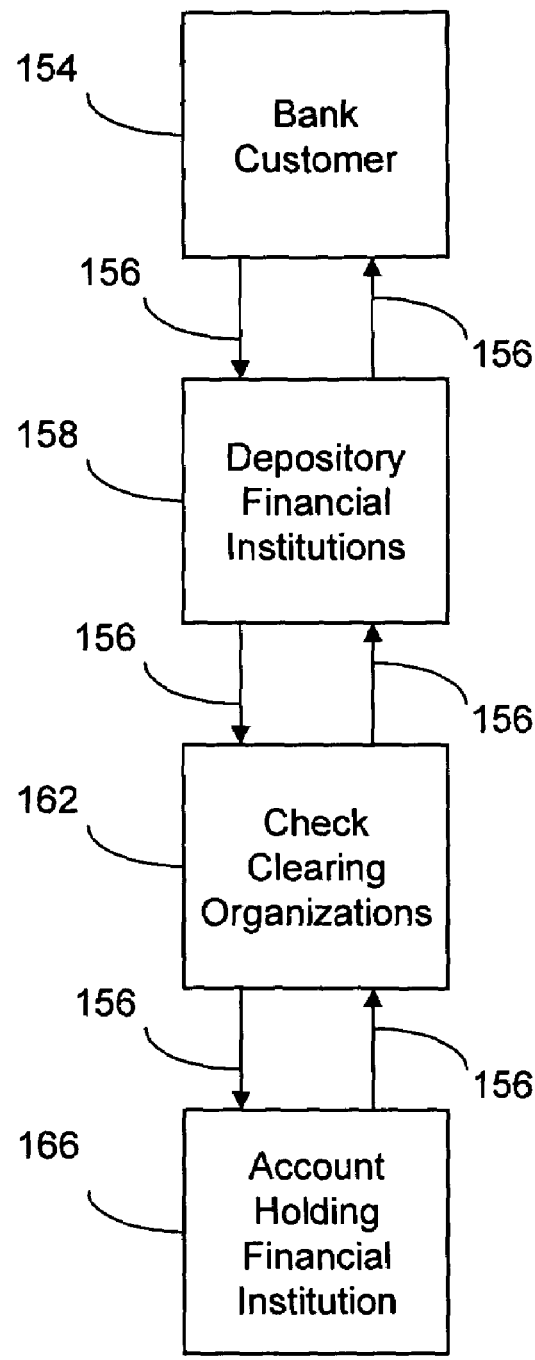
FIG. 1 depicts conventional methods of handling fraudulent checks deposited at a financial institution among participating financial institutions and supporting organizations.
Figure 2:
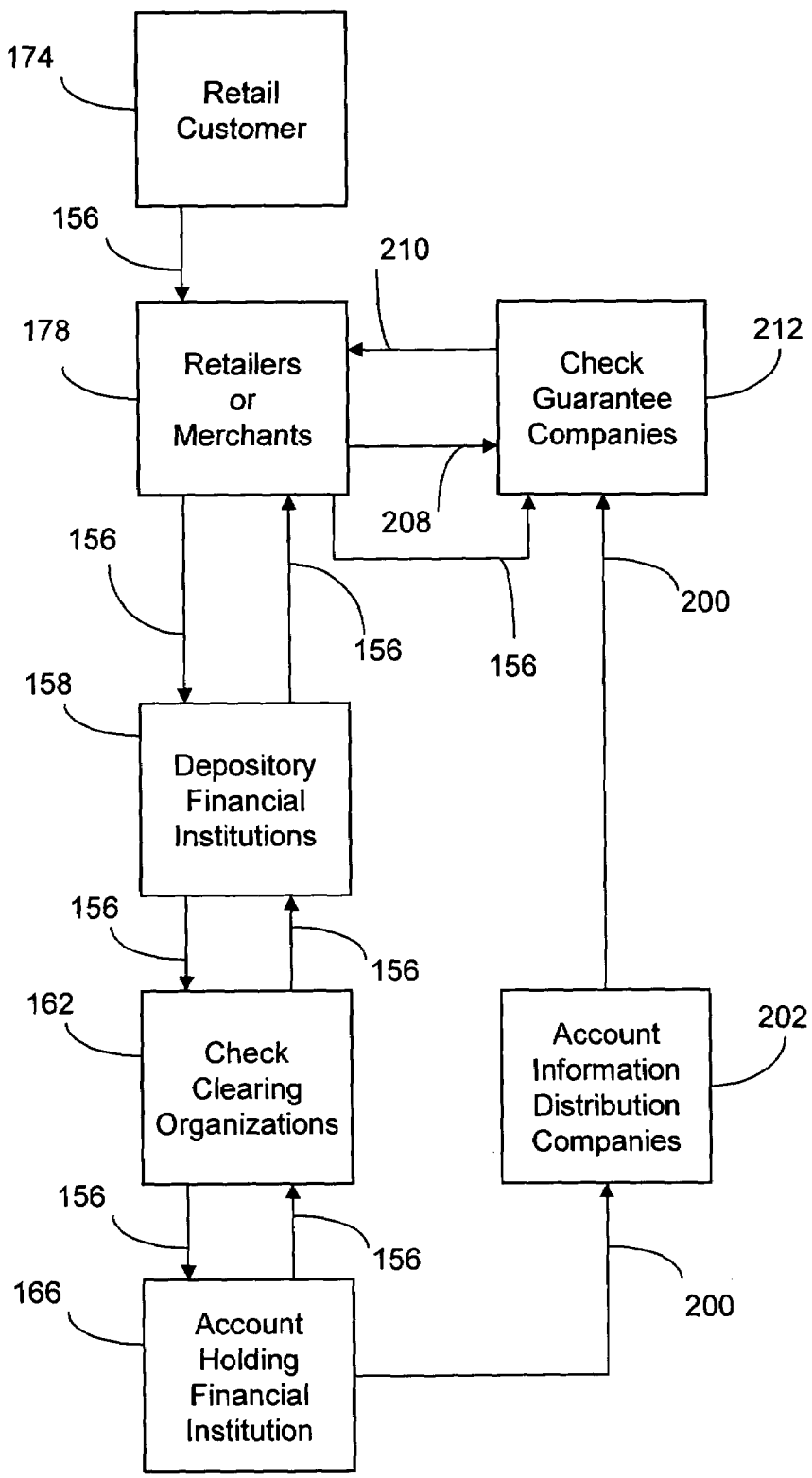
FIG. 2 depicts conventional methods of handling fraudulent checks used to make payments to retailers or merchants among participating financial institutions, retailers or merchants and supporting organizations.
Figure 3A:
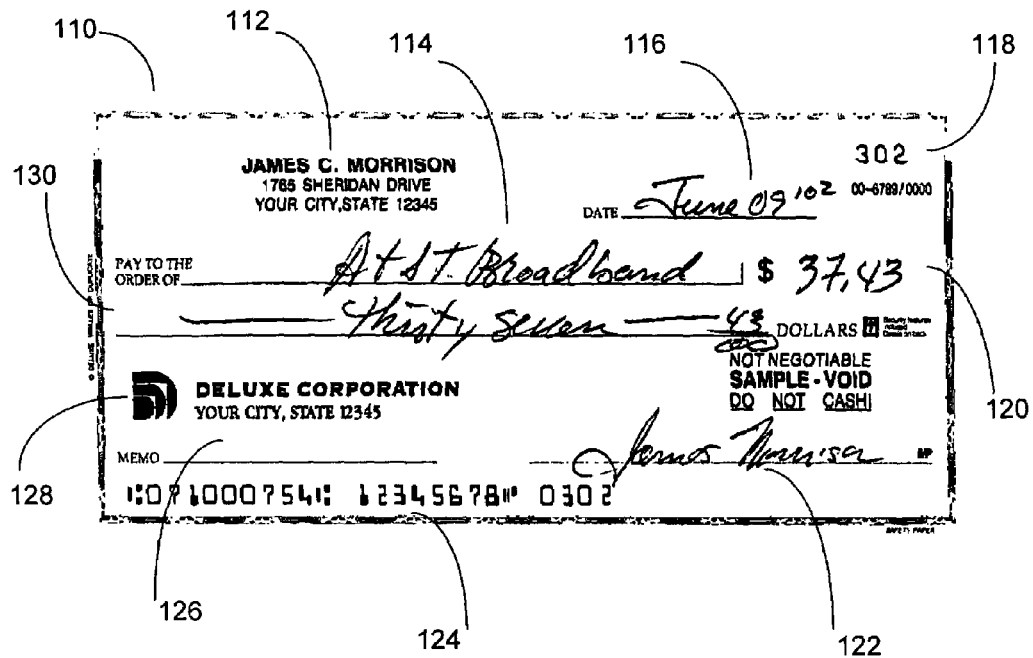
FIGS. 3A and 3B show images of the face of a typical personal check and a typical business check respectively.
Figure 3B:
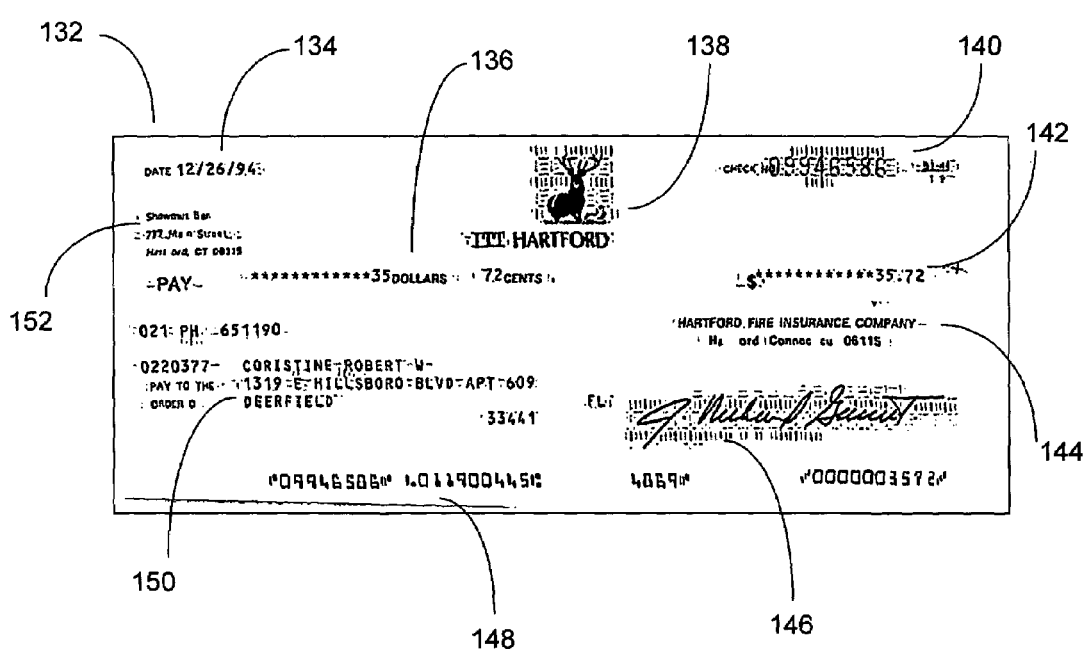

FIGS. 3A and 3B depict samples of a personal check 110 drawn on an account owned by a person and a business check 132 drawn on an account owned by a business entity, respectively, each check having multiple preprinted and handwritten information fields.

The preprinted fields on the personal check 110 include a payer name and address field 112, a financial institution logo and name field 128, a MICR (Magnetic Ink Character Recognition) field 124, and a check number field 118. The payer name and address field 112 includes the name and address of the individual or entity who owns the account. The financial institution logo and name field 128 includes the graphic symbol used by and the name and address of the financial institution holding the account. The MICR field 124 includes the MICR characters denoting the code assigned to the financial institution holding the account, the account number assigned to the account held by the financial institution, and, optionally, the check number in MICR characters. The check number field 118 includes the number assigned to the specific check to distinguish it from other checks written against the same account.

The handwritten information fields on the personal check 110 include a payee field 114, a legal amount field 130, a courtesy amount field 120, a date field 116, a signature field 122, and a memo field 126. The payee field 114 includes the name of an individual or entity the check is paid to. The legal amount field 130 includes the amount for which the check is written in dollars and cents in alphanumeric form. The courtesy amount field 120 includes the amount for which the check is written in dollars and cents in numeric form. The date field 116 includes a date after which the check may be paid in terms of month, day, and year in either numeric or alphanumeric form. The signature field 122 includes the handwritten signature of one of the owners of the account or other person authorized by the owner or owners to write checks on the account. Generally, the "signature" is the name of the person written with the person's own hand. The memo field 126 may include any information a writer of the check desires to enter.

The preprinted information fields on the business check 132 include a payer name and address field 144, a payer logo field 138, a financial institution name field 152, and a MICR field 148. The payer name and address field 144 includes the name and address of the individual or entity who owns the account. The payer logo field 138 contains the logo used to identify the payer and, optionally, the payer name. The financial institution name field 152 includes the name and address of the financial institution holding the account. The MICR field 148 includes the MICR characters denoting the code assigned to the financial institution holding the account and the account number assigned to the account by the financial institution.

The machine printed information fields on the business check 132 include a payee field 150, a legal amount field 136, a courtesy amount field 142, a date field 134, a check number field 140, and a signature field 146. The payee field 150 includes the name of an individual or entity. The legal amount field 136 includes the amount for which the check is written in dollars and cents in alphanumeric form. The courtesy amount field 142 includes the amount for which the check is written in dollars and cents in numeric form. The check number field 140 includes the number assigned to the specific check to distinguish it from other checks written against the same account. The date field 134 includes a date after which the check may be paid in terms of month, day, and year in either numeric or alphanumeric form. The signature field 122 includes the handwritten signature of one of the owners of the account or other person authorized by the owner or owners to write checks on the account, or, optionally, a facsimile signature of one of the owners of the account or other person authorized by the owner or owners to write checks on the account. Generally, the "signature" is the name of the person written with the person's own hand. A "facsimile signature" is a digitized version of a signature printed by a machine.

The present invention is directed to a system and method that generates a public check validation profile by extracting characteristics from the preprinted, handwritten and machine-printed fields of one or more valid checks drawn on an account and storing the characteristics in the form of a mathematical representation. The public check validation profile can be used by a legitimate third party business entity, e.g., financial institutions, to validate checks drawn on the account without exposing any account information subject to privacy laws and regulations or useful for anyone attempting to perpetrate fraud against the account.

Figure 4:
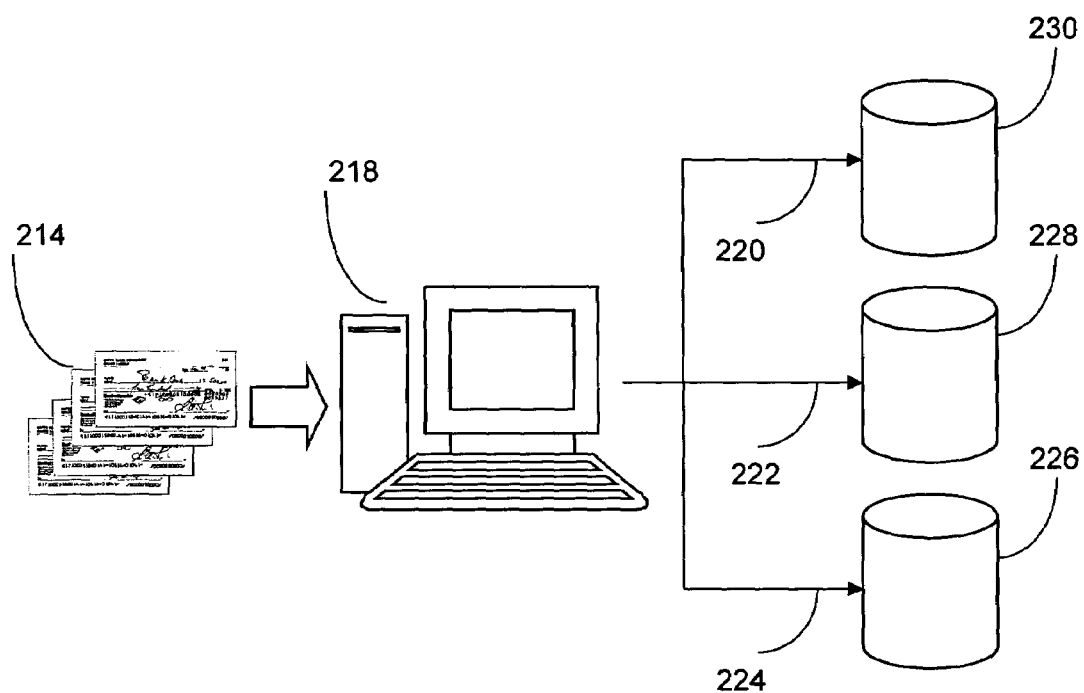
FIG. 4 is a schematic overview of a system for creating account profiles from a set of images of known valid checks on an account according to some embodiments of the present invention.

FIG. 4 is a schematic overview of a system for creating account profiles from a set of images of known valid checks on an account according to some embodiments of the present invention. A set of images of known valid checks 214 drawn on an account is provided to a profile creation computer system 218 on which profile creation computer software is stored and operated. Using the set of images of known valid checks 214, the profile creation computer system 218 generates three separate profiles:

- a public check validation profile 220 stored in a public check validation profile computer storage facility 230;
- an internal check validation profile 222 stored in an internal check validation profile computer storage facility 228; and
- a suspect review profile 224 stored in a suspect review profile computer storage facility 226.

Figure 16:
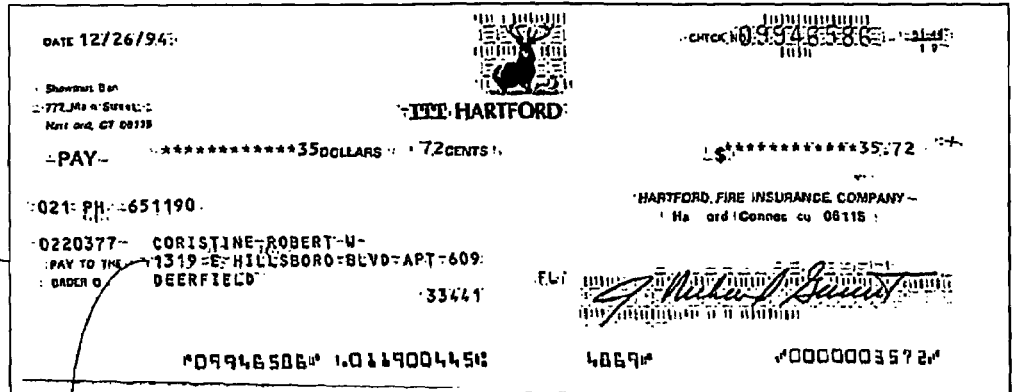
FIG. 16 shows an image of the front side of a typical business check made payable to a person and an image of the back side of the same check showing the payee's endorsement.
Figure 16:
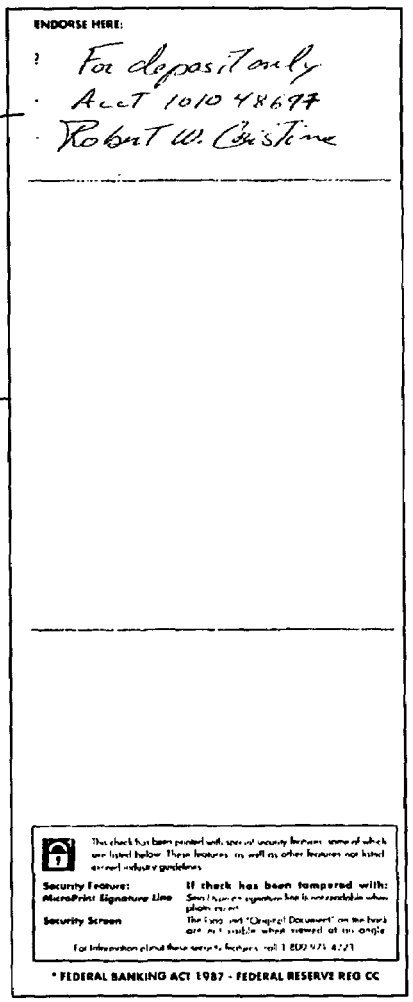

Optionally, the profile creation computer system 218 can also create a check casher profile by extracting the payee name and address field from an image of the front side of a check and the characteristics of the payee endorsement from an image of the back side of the same check. FIG. 16 depicts two check images 182 and 184, image 182 corresponding to the front side of a business check 132 including the payee name and address field 183 and image 184 corresponding to the back side of the same check including the payee endorsement field 185.

The internal check validation profile 222 and the suspect review profile 224 are intended for internal use by the financial institution holding the account. The public check validation profile 220 is intended to be distributed to other business entities for them to validate checks drawn on the account for which the public check validation profile 220 is created.

The public check validation profile 220 contains a mathematical representation of the characteristics of preprinted check stock elements for each different type of check stock extracted from the set of images of known valid checks on an account. For a personal check 110, the profile contains a representation of the location and feature characteristics of one or more preprinted fields including, but not limited to, the payer name and address field, the financial institution logo and name field, the MICR field and check number field. For a business check 132, the profile contains a representation of the location and feature characteristics of one or more preprinted fields including, but not limited to, the payer name and address field, the payer logo field, the financial institution name field and the MICR field.

The public check validation profile 220 also contains a mathematical representation of the characteristics of the handwritten and/or machine-printed fields for each different type of check stock extracted from the set of images of known valid checks 214 on an account. For a personal check 110, the typical handwritten information fields include, but are not limited to, the payee field, the legal amount field, the courtesy amount field, the date field, the signature field and memo field. For a business check 132, the typical machine-printed information fields include, but are not limited to, the payee field, the legal amount field, the courtesy amount field, the date field, the check number field and signature field. In some embodiments, the public check validation profile 220 is in ASCII or binary format or the combination thereof.

The profile creation computer software running on the profile creation computer system 218 analyzes each image in the set of document images 214 and identifies the locations of predefined information fields in the image using one or more predefined lexicons. A lexicon is a data structure containing a group of keywords, phrases, and symbols commonly found on a particular type of negotiable document. For a check, the lexicon may include keywords and phrases like "Pay to the Order of," "Date," and "Memo". The lexicon may also include the dollar sign "$" and the MICR symbols like "⑈." The dollar sign "$" identifies the courtesy amount field 120 and the MICR symbol "⑈" identifies the beginning of the MICR field 124 or 148. The computer software uses a template of the document structure identifying where each field of interest is located on the document if the document has a standard structure that can be represented in such a template. For example, there is a template for the standard structure associated with the personal check 110.

The predefined information fields identified by the computer software usually include preprinted fields matching a component in the lexicon and other fields found on the image that do not match any component in the lexicon. In some embodiments, the latter fields are found by identifying clusters of image elements that exhibit a predefined shape.

Different forms of business checks may be drawn on a business account for different purposes. For instance, a business may use one form of checks to make employee salary payments and another form of checks to pay companies that supply the business with products or services. Similarly, for a personal account jointly owned by multiple persons, different persons may use different forms of checks. Therefore, the computer software needs to determine whether the multiple images in the set of images of known valid checks 214 are images of a single document form or multiple document forms. To do so, the computer software clusters the images in accordance with their respectively extracted information fields. Images that fall into the same cluster are images of the same document form and will be analyzed together. Images that fall into different clusters have different document forms. Each cluster of images will be analyzed separately.

For each cluster of images extracted from the set of images of known valid checks 214, the computer software analyzes the content of each extracted information field to determine whether the content corresponds to machine-printed characters, handwritten characters, or graphic elements. To separate machine-printed content fields from handwritten content fields, the computer software may apply two separate functions together or separately. The first function looks for characteristics in the content that match the characteristics typical of handwriting, e.g., irregular character height, lack of straightness in the character line, character width differences and the like. The second function looks for characteristics in the content that match the characteristics typical of machine printing, e.g., regularity in terms of character height and width, uniform white space between characters, and straightness of the character line. In one embodiment, information fields deemed as containing machine-printed characters can be further analyzed using character recognition software. If the information field indeed contains machine-printed content, a coherent string of recognized characters will be returned by the character recognition software.

A negotiable document such as a check typically includes both preprinted characters and graphics that appear consistently on different paper copies and machine-printed and/or handwritten characters that vary from one copy to another. For each cluster of document images 214, the computer software clusters the information fields extracted from the images and analyzes the content of each extracted information field to determine whether it appears in the same location in different images. Those information fields appearing in the same location on all images in the cluster are deemed as the preprinted fields. For each preprinted field in the cluster of images extracted from the set of images of known valid checks 214, the profile creation software encodes the characteristics of the field including, but not limited to, the size of the field, its shape, its location on the image, and its location relative to other preprinted and/or machine-printed or handwritten fields, etc., into the public check validation profile 220.

For each machine-printed information field, the profile creation software encodes the characteristics of the field including, but not limited to, a field identifier, the size of the field, its shape, its location on the image, and its location relative to other preprinted fields and machine-printed fields, into the public check validation profile 220. For those fields that include both machine-printed text characters and numbers, the encoded characteristics may include the field syntax, the number of lines of text in the field, the length of each line, an identifier for the type font or fonts and the character size. In some embodiments, the characteristics may also include the type of filler character, if any, such as an asterisk (*) used to occupy space in a fixed length field such as the legal amount field 136 not filled by the characters of the actual data printed in the field. In one embodiment, the characteristics of each machine-printed field are used as input into artificial neural network software that analyzes the characteristics and produces a set of neural network output parameters in the form of a string of numbers and characters, which are stored in the public check validation profile 220.

For each handwritten information field, the profile creation software encodes the characteristics of the field including, but not limited to, a field identifier, the size of the field, its shape, its location on the image, and its location relative to the other preprinted and variable data fields, into a mathematical representation and stores the representation in the public check validation profile 220. In some embodiments, the characteristics of the writing in a handwritten field may also include, but not limited to, the slant of the writing, the size of the characters, the stroke curvature and the density. In one embodiment, the characteristics of each handwritten field are used as input into artificial neural network software that analyzes the characteristics and produces a set of neural network output parameters in the form of a string of numbers and characters, which are stored in the public check validation profile 220.

A unique feature of the signature field is that the signatures extracted from the images in the set of images of known valid checks 214 may vary from one to another, even if they are signed by the same person. To capture the characteristics of a person's signature, the computer software clusters all the signature fields extracted from the images in the set of images of known valid checks 214. Signature fields that fall into the same cluster have essentially the same signature made by the same person. Signature fields that fall into different clusters that are statistically close together include valid variant signatures made by the same person. Signature fields that fall into different clusters that are statistically different from one another include signatures made by different people. In one embodiment, the characteristics of the signature fields in each cluster are used as input into artificial neural network software that analyzes the characteristics and produces a set of neural network output parameters in the form of a string of numbers and characters, which are stored in the public check validation profile 220.

The clustering of the handwritten signature field 146 on a business check 132 results in three types of clusters. Signature fields that fall into the same cluster include essentially the same signature made by the same person. Signature fields that fall into different clusters that are statistically close together include valid variant signatures made by the same person. Signature fields that fall into different clusters that are statistically different from one another include signatures made by different people. In one embodiment, the characteristics of the signature fields in each cluster are used as input into artificial neural network software that analyzes the characteristics and produces a set of neural network output parameters in the form of a string of numbers and characters, which are stored in the public check validation profile 220.

Collectively, the public check validation profile 220 includes information about each preprinted and machine-printed or handwritten information field on a particular form of negotiable documents identified in the set of document images 214. For each information field, the public check validation profile 220 may contain a field identifier, the size of the field, its shape, its location relative to the boundaries of the image, and its location relative to all other preprinted and machine-printed or handwritten information fields on the document. In one embodiment, the public check validation profile 220 may contain the neural network output parameters for each extracted information field processed by artificial neural net software. The public check validation profile 220 is identified by the MICR characters associated with an account. The MICR characters include numbers that identify the financial institution that manages the account and numbers that identify the specific account at that financial institution.

Figure 5:
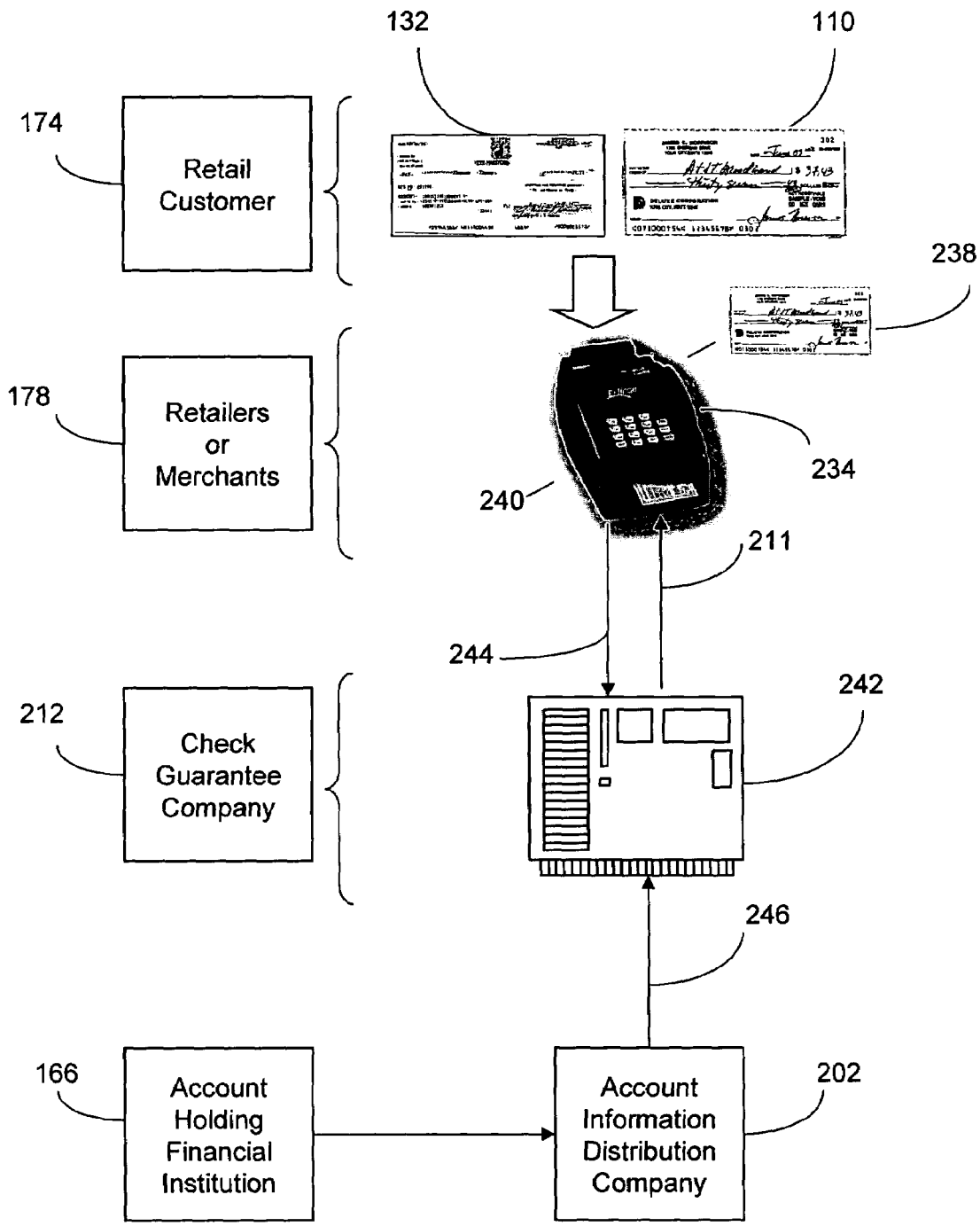
FIG. 5 is a flowchart illustrating one embodiment of validating checks presented for payment at retailers or merchants or to a check cashing service for cashing.

FIG. 5 is a flowchart illustrating one embodiment of validating checks presented for payment at retailers or merchants or to a check cashing service for cashing. A retail customer 174 makes a payment or presents a check for cashing in the form of a personal check 110 or a business check 132 to a retailer or merchant 178. The retailer or merchant 178 inserts the check into imaging device 234. Imaging device 234 can be any one of the devices commonly used at retailer or merchant cashier stations. Alternatively, imaging device 234 is an image capture and MICR data-reading device integrated with a point-of-sale computer system used by a retailer or merchant. In this case, the image and data storage and the transmission of data are functions provided by the point-of-sale computer system.

After imaging device 234 captures a check image 238, feature extraction software running in imaging device 234 analyzes the check image 238 and extracts a set of characteristics 240 from that image. The retailer or merchant 178 submits an enhanced check guarantee request 244 to a check guarantee company 212. This enhanced check guarantee request 244 includes check guarantee data plus the set of characteristics extracted from the check image 238. The check guarantee company 212 examines its internal files and enhanced account information 246 received from account information distribution companies 202.

In some embodiments, such enhanced account information 246 includes closed accounts and stop payment information and a public check validation profile associated with the account. As part of its check guarantee decision process, the check guarantee computer system 242 compares the set of characteristics 240 with the public check validation profile. The comparison result is included in the check guarantee decision 211, affirmative or negative, sent back to the retailer or merchant 178.

If no adverse information is found and the set of characteristics 240 matches the public check validation profile, the check guarantee company 212 gives an affirmative check guarantee decision 211 for the check to the retailer or merchant 178. In this case, both the retailer or merchant 178 and the check guarantee company 212 are more assured that the check is a legitimate one made by a person authorized to write checks on the account.

In some embodiments, the enhanced check guarantee request 244 includes the check image 238 in place of the set of characteristics 240 extracted from that image. In this case, the extraction of the set of characteristics 240 from the check image 238 takes place at the check guarantee company 212 as part of processing the enhanced check guarantee request 244.

In some embodiments, the set of characteristics 240 includes the characteristics of the payee endorsement as shown in a back side image in FIG. 16. The characteristics of the payee endorsement can be compared to a profile associated with the check casher to determine whether those characteristics match the endorsement characteristics in the corresponding check casher profile.

When the check guarantee computer system 242 receives the enhanced check guarantee request 244, the fraud detection software running on the computer system identifies the financial institution routing/transit number and the account number contained in the MICR characters as part of the request 244. Using these numbers, the fraud detection software retrieves the public check validation profile 220 for that account to analyze the check image 238 or, alternatively, the set of characteristics 240 previously extracted from the check image 238.

Fraud detection consists of several steps. One step involves determining whether the preprinted fields on the new check image 238 match the characteristics of the preprinted fields in the public check validation profile 220. In some embodiments, the characteristics for a preprinted field in the public check validation profile 220 include, but not limited to, the size of the field, its shape, its location on the image, and its location relative to the both the other preprinted fields as well as other machine-printed or handwritten fields.

The fraud detection software extracts from the check image 238 the characteristics of each specific preprinted information field and compares them to the characteristics of a preprinted information field in the public check validation profile 220. In some embodiments, the characteristics of each specific preprinted information field are obtained from the set of characteristics 240 previously extracted from the check image 238. The comparison result for each preprinted field includes the degree to which the characteristics extracted from the new check image 238 matches or does not match the corresponding characteristics of the preprinted field in the profile. If the public check validation profile 220 includes more than one document form, the fraud detection software performs the comparison for each document form included in the public check validation profile 220. In one embodiment, for each preprinted field, the fraud detection software returns a numeric value on a scale of 0 to 100 indicating the overall degree of match between the characteristics of a preprinted field extracted from the new check image 238 and the characteristics of the field in the public check validation profile 220. For example, a numeric value near 0 indicates that the characteristics for the two preprinted fields match closely while a numeric value near 100 indicates that the characteristics of the two preprinted fields do not match.

The comparison results for each preprinted field on the new check image 238 are aggregated to determine overall whether the preprinted fields in the new check image 238 match the characteristics of a particular document form in the profile 220. In one embodiment, the fraud detection software returns a numeric value on a scale of 0 to 100 indicating the overall degree of match for the preprinted fields extracted from the new check image 238.

Another step involves determining whether the machine-printed or handwritten information fields in the new check image 238 match the characteristics of the machine-printed or handwritten fields associated with one document form in the public check validation profile 220. To do so, the computer software analyzes each field containing content unique to a specific document to determine whether the content includes machine-printed or handwritten characters. For each machine-printed or handwritten field, the fraud detection software extracts a set of characteristics and compares them to the corresponding set of characteristics in the profile.

To determine whether the content of a particular information field extracted from the new check image 238 is machine-printed or handwritten, the computer software may invoke two separate functions either together or separately. The first function looks for content characteristics that match the characteristics typical of handwriting such as irregular character height, lack of straightness in the character line, character width differences and the like. The second function looks for content characteristics that match the characteristics typical of machine printing such as regularity in terms of character height and width, uniform white space between characters, and straightness of the character line. In one embodiment, the content of those fields identified as containing machine printing can be further analyzed using character recognition software. If the field actually contains machine-printed content, a coherent string of recognized characters will be returned by the character recognition software.

For each field containing machine-printed content, the fraud detection software encodes the characteristics of the field including, but not limited to, the field syntax, the number of lines of text in the field, the length of each line as well as an identifier for the type font or fonts used and the character size in each line. The characteristics can also include the type of filler character, if any, such as an asterisk (*) found in the legal amount field 136 when the data in the field does not fill the entire allowed field length. In one embodiment, the characteristics of each machine-printed field are used as input to artificial neural network software that analyzes the characteristics for each field. The neural network software returns a comparison result for the field on a scale of 0 to 100 indicating the degree of match between the machine-printed field in the new check image 238 and the same field stored in the public check validation profile 220. For example, a numeric value near 0 indicates that the characteristics for the two machine-printed fields match closely while a numeric value near 100 indicates that the characteristics of the two machine-printed fields do not match.

The comparison results for the machine-printed fields extracted from the new check image 238 are aggregated. In one embodiment, the aggregation result is a numeric value on a scale of 0 to 100 indicating the overall degree of match between the characteristics of all the machine-printed fields in the new check image 238 and the characteristics of the machine-printed fields in the associated document form in the public check validation profile 220. For example, a numeric value near 0 indicates that the characteristics for the machine-printed fields match closely while a numeric value near 100 indicates that the characteristics of the machine-printed fields do not match.

For each field containing handwritten content other than, e.g., the signature field, the fraud detection software encodes the characteristics of the hand writing including, but not limited to, the slant of the writing, the size of the characters, stroke curvature and density. In one embodiment, the characteristics of each handwritten field are used as input to artificial neural network software that analyzes the characteristics and returns a comparison result for the field indicating the degree of match.

For the signature field, the fraud detection software encodes the characteristics of the handwriting including, but not limited to, the slant of the writing, the size of the characters, stroke curvature and density. In one embodiment, the characteristics of signature field are used as input to artificial neural network software that analyzes the characteristics and returns a comparison result for the signature field indicating the degree of match between the signature field and a signature field stored in the public check validation profile 220. In one embodiment, the result is a numeric value on a scale of 0 to 100 indicating the overall degree of match between the characteristics of the one or more signature fields in the new check image 238 and the characteristics of the signature fields in the associated document form in the public check validation profile 220. For example, a numeric value near 0 indicates that the characteristics for the signature fields match closely while a numeric value near 100 indicates that the characteristics of the signature fields do not match.

In one embodiment, the fraud detection software aggregates the comparison results from the analysis of the preprinted fields, the content of the machine-printed and/or handwritten fields, and the signature field, and produces an aggregate result having two possible values, "Accept" or "Suspect". A result of "Accept" means that there is a sufficiently close match between the characteristics extracted from the new check image 238 and the characteristics in the public check validation profile 220 such that the document represented in the new check image 238 is valid and should be accepted. A result of "Suspect" means that there are sufficient differences between the characteristics extracted from the new check image 238 match and the characteristics in the public check validation profile 220 such that the document represented in the new check image 238 is potentially fraudulent. In one embodiment, a numeric value on a scale of 0 to 50,000 is provided along with the "Accept" or "Suspect" result to quantify the similarity/dissimilarity between the characteristics extracted from the new check image 238 and the characteristics in the public check validation profile 220. For example, a numeric value near 0 indicates that the document represented by new check image 238 is valid while a numeric value near 50,000 indicates that the document represented by new check image 238 does not match the characteristics in the public check validation profile 220 and has a significant probability of being fraudulent.

In some embodiments, the fraud detection software returns a result of "Not present" for any preprinted, machine-printed or handwritten field that is missing from the new check image 238 when the public check validation profile 220 indicates that it should be present on all images of a particular document form.

In some other embodiments, the fraud detection software returns a result of "Unreadable" for any preprinted, machine-printed or handwritten field that is found in the new check image 238, but whose content cannot be successfully extracted by the software.

Figure 6:
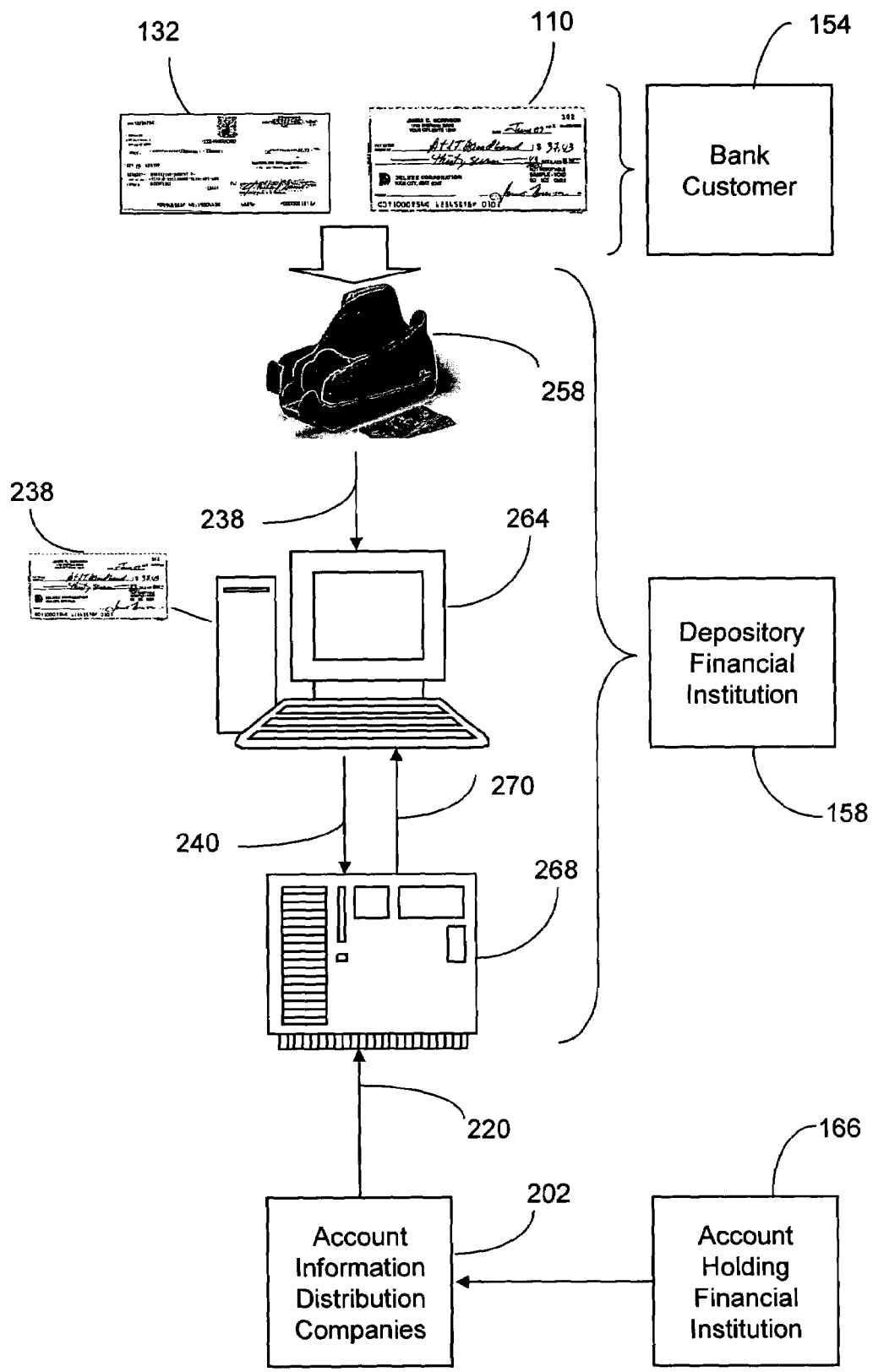
FIG. 6 is a flowchart illustrating one embodiment of validating checks deposited at a depository financial institution.

FIG. 6 is a flowchart illustrating one embodiment of validating checks deposited at a depository financial institution involving multiple participating organizations. A bank customer 154 makes a deposit including a personal check 110 or a business check 132 at a depository financial institution 158. A teller or clerk inserts the check into imaging device 258 to capture a check image 238. Different types of check image capture devices commonly used by financial institutions and check processing organizations can be used here. One example is a type of high-speed check reader-sorter with imaging capabilities commonly used in high-volume check processing operations. Another example is a type of medium-speed check reader-sorter with imaging capabilities commonly used in medium-volume check processing operations. Yet another example is a type of low-speed check readers with imaging capabilities used in very low volume check processing operations. Still another example is a check image reader and image capture device used to add check image capture capabilities to a financial institution's teller system.

The imaging device 258 transmits the check image 238 to a teller system controller 264 for validation. Feature extraction software running in the teller system controller 264 analyzes the check image 238 and extracts a set of characteristics 240 from that image. Teller system controller 264 transmits the set of characteristics 240 to a check validation computer system 268 operated by the depository financial institution 158. The check validation computer system 268 compares the set of characteristics 240 with a public check validation profile 220 associated with the account. The depository financial institution 158 obtains the public check validation profile 220 from an account information distribution company 202 who in turn obtains the public check validation profile 220 from the account holding financial institution 166.

In some embodiments, the teller system controller 264 transmits the check image 238 to the check validation computer system 268. In this case, extraction of the set of characteristics 240 from the check image 238 is done by the check validation computer system 268.

In some other embodiments, the check image 238 captured by the imaging device 258 is delivered to a computer system other than the teller system controller 264. In this case, the other computer system then delivers the check image 238 or, alternatively, the set of characteristics 240, to the check validation computer system 268.

The comparison result is included in the check validation result 270 transmitted back to the teller system controller 264. If the set of characteristics matches the public check validation profile 220, the depository institution assumes that check 156 is valid. If the set of characteristics 240 does not match the public check validation profile 220, the check becomes a fraud suspect and the depository institution can take appropriate actions accordingly to reduce risk of loss. Such actions include:

reducing the deposit by the amount written in the check and returning the check to the bank customer 154;

placing a hold on the funds represented by the check until it is either paid or returned by the account holding financial institution 166; or accepting the check for collection (the bank customer 154 account is not credited with the amount of the check until that amount is actually received from the account holding financial institution 166).

In some embodiments, fraud suspects identified by businesses accepting checks such as a check guarantee company 212 or a depository financial institution 158 are sent to the account holding financial institution 166. The account holding financial institution 166 uses its internal check validation profile and suspect review profile to further determine whether the fraud suspect is actually fraudulent. The result of this determination is also sent back to the entity that submits the fraud suspects.

Figure 7:
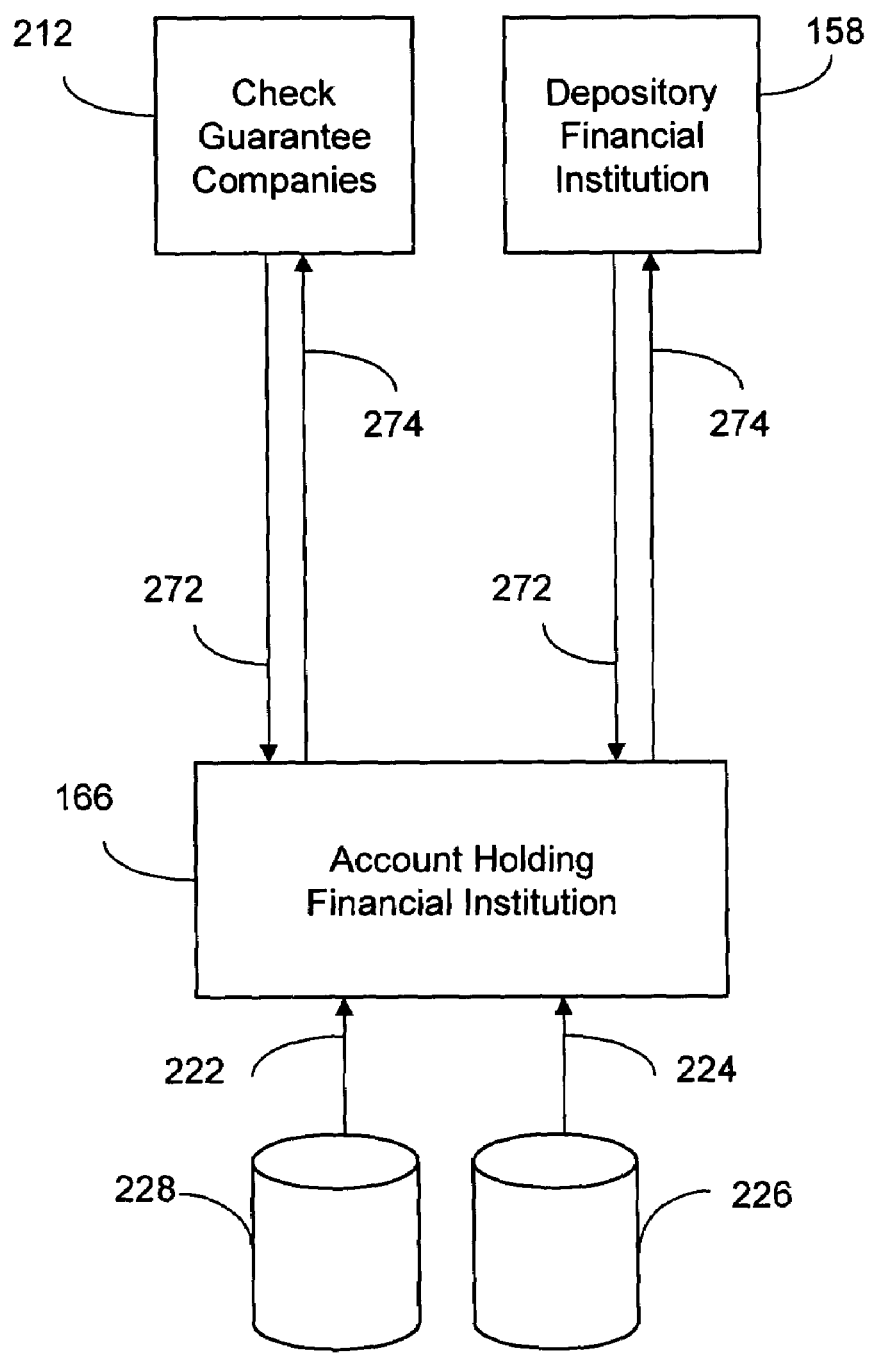
FIG. 7 is a flowchart illustrating one embodiment of an account holding financial institution evaluating a fraud suspect image received from a check guarantee company or a depository financial institution and returning the fraud determination result.

FIG. 7 is a flowchart illustrating one embodiment of an account holding financial institution 166 evaluating a fraud suspect image 272 received from a check guarantee company 212 or a depository financial institution 158 and returning the fraud determination result 274. Any check whose characteristics do not match those in the public check validation profile is a fraud suspect. The check guarantee company 212 or the depository financial institution 158 sends the fraud suspect image 272 to the account holding financial institution 166. In analyzing the fraud suspect image 272 to determine whether the check is actually fraudulent, the account holding financial institution 166 accesses the corresponding internal check validation profile 222 from its internal check validation profile computer storage facility 228. After the comparison of the fraud suspect image 272 and the internal check validation profile 222, the account holding financial institution 166 uses the suspect review profile 224 obtained from its suspect review profile computer storage facility 226 to make a final determination with respect to the validity of the check. Next, the account holding financial institution 166 sends the final fraud determination result 274 to the check guarantee company 212 or the depository financial institution 158.

A financial institution is subject to regulations that require retention of check images for up to seven years. Instead of providing long-term storage for their own check images, many financial institutions use long-term check image storage services offered by shared check image archive vendors. To ensure that no fraudulent checks are used in creating profiles, the set of images used to create profiles should include only checks presented for payment on dates that are certain days prior to the profile creation date. For instance, a financial institution may specify that the date difference must be at least sixty (60) days between the latest payment date for a check included in the set of images used to create a profile and the profile creation date. A date difference of sixty (60) days allows sufficient time for any fraudulent checks to be identified and eliminated from the check images used in the profile creation process. Since images of checks paid sixty (60) days prior to the profile creation date may be stored in shared check image archives, an account holding financial institution may prefer to have profiles created by a shared check image archive vendor rather than creating its own profiles.

Figure 8:
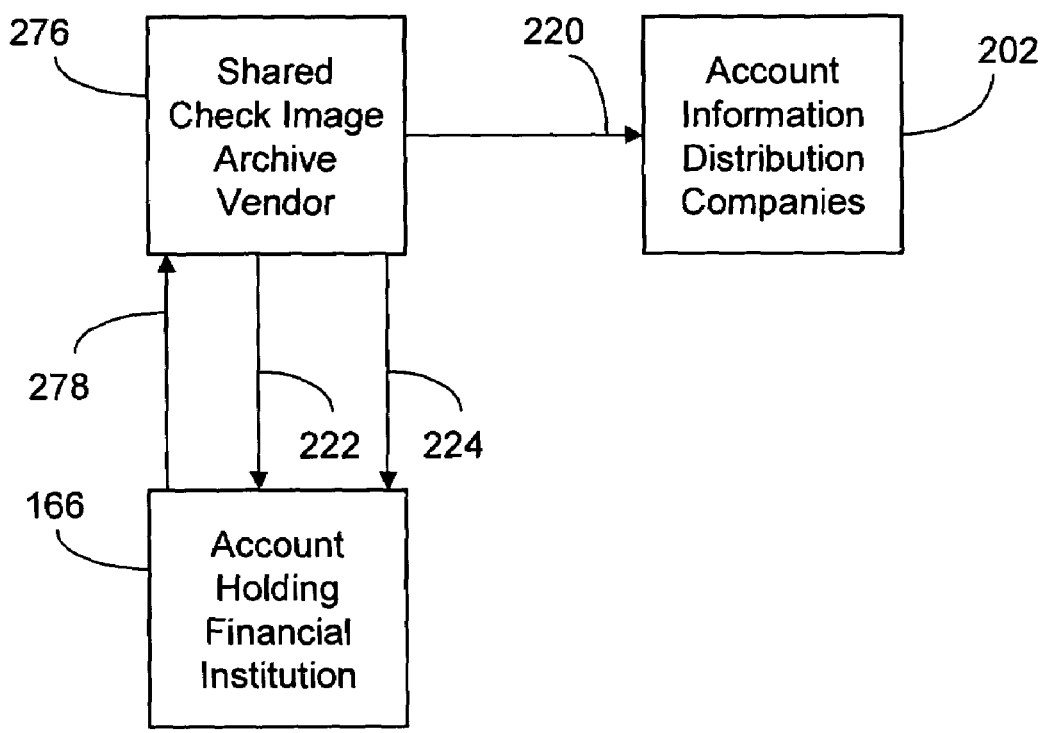
FIG. 8 is a flowchart illustrating one embodiment of a shared check image archive vendor creating profiles on behalf of account holding financial institutions.

FIG. 8 is a flowchart illustrating one embodiment of a shared check image archive vendor creating profiles on behalf of an account holding financial institution. Account holding financial institution 166 submits a profile creation request 278 to the shared check image archive vendor 276. The profile creation request 278 includes a list of the check images to be used in the profile creation process. The shared check image archive vendor 276 retrieves the check images from its check image storage facilities and processes those images to generate profiles using profile creation software. The internal check validation profile 222 and the suspect review profile 224 are delivered back to the account holding financial institution 166. The public check validation profile 220 is delivered to the account information distribution companies 202.

The system and method according to the present invention allows all industry participants to make contributions to the realization of the system and method while obtaining significant benefits from doing so. Table 1 depicts the industry participants, their principal contributions and the primary benefits they derive from the use of the present invention.

TABLE 1

| Industry Participant | Contributions Made | Benefits Obtained |
| --- | --- | --- |
| Account Holding Financial Institutions | Profile image set specifications for all on-us accounts<br>Public check validation profiles for accounts either directly or through shared check image archive vendors | Reduced fraud losses<br>Early fraud suspect notifications from Check Guarantee Companies and Depository Financial Institutions |
| Depository Financial Institutions | Early fraud notifications to account holding financial institutions | Reduced fraud losses<br>Public check validation profiles for accounts held at other financial institutions<br>Evaluation results for fraud suspect items delivered to account holding financial institutions |
| Retailers and Merchants | Check images captured at retail or merchant point-of-sale | Lower check guarantee fees for imaged checks<br>Fewer returned checks due to fraud |
| Check Guarantee Companies and Check Cashing Companies | Early fraud notifications to account holding financial institutions | Reduced fraud losses<br>Public check validation profiles for accounts held at other financial institutions<br>Evaluation results for suspect items delivered to account holding financial institutions |
| Account Information Distribution Companies | Distribution facility for public check validation profiles | Added information distribution service for client financial institutions and check guarantee companies |

To implement the invention described above, industry participants make use of a variety of computer software components specific to the invention in addition to other computer software they use in operating their business. Table 2 shows the industry participants and the primary computer software components that each participant would use to realize a system and method of the present invention.

TABLE 2

| Industry Participant | Primary Software Component Usage |
| --- | --- |
| Account Holding Financial Institutions | Software for validating checks from check images using internal check validation profiles<br>Software for reviewing fraud suspect images using suspect review profiles<br>Software for creating profiles from a set of images of known good checks on an account including:<br>public check validation profiles<br>internal fraud detection profiles<br>suspect review profiles |
| Depository Financial Institutions | Software for extracting a set of characteristics from check images<br>Software for validating checks from check images using public check validation profiles |
| Retailers and Merchants | Software for extracting a set of characteristics from check images |
| Check Guarantee Companies and Check Cashing Companies | Software for validating checks from check images using public check validation profiles |

In addition to the features described above, below are a few alternative features that may be implemented in the present invention:

A full or partial check image rather than a set of characteristics extracted from the image can be sent from the location at which the check is presented to another site for validation.

Check validation for checks drawn on certain accounts can take place at each point of check presentment if the public check validation profile for those accounts and the software for validating checks from check images using public check validation profile were implemented on the computer systems used at the point of check presentment. Validation for checks drawn on other accounts would be done at another location.

Check guarantee companies or depository financial institutions can receive profile updates automatically from account information distribution companies whenever new or changes in profiles are received by the account information distribution companies.

The check guarantee companies or depository financial institutions can send the fraud suspects to an account information delivery company which would in turn deliver each fraud suspect to the appropriate account holding financial institution.

The account holding financial institution can send fraud determination results to an account information delivery company which in turn delivers each fraud determination result to the appropriate check guarantee company or depository financial institution.

Account holding financial institutions can distribute the public check validation profiles directly to recipients.

An account holding financial institution can contract with another company such as a shared check image archive vendor to provide fraud suspect review service.

The public check validation profile can contain sufficient information to determine that a check is definitely fraudulent without invoking the internal check validation profile or the suspect review profile.

The retailer or merchant can receive and use the public check validation profiles directly from account holding financial institutions or through account information distribution companies. In this case, the retailer or merchant could also generate fraud suspects and send them directly to account holding financial institutions or through account information distribution companies for analysis.

Public check validation profiles can be provided to some third-party payment processors for use in validating the checks they process. Such third-party payment processors could also generate fraud suspects and send them directly to account holding financial institutions or through account information distribution companies for analysis.

Industry participants can use public check validation profiles to determine the usability of a check image without having to perform the analysis required to determine whether the check is potentially fraudulent. The usability analysis is typically limited to determining whether the fields required for negotiability are present in the image and readable.

It will be apparent to one skilled in the art that the present invention is applicable to any negotiable document whose validity can be determined by comparing a set of characteristics extracted from the document image with a set of characteristics extracted from a known valid document or set of such documents and/or comparing the characteristics of the cursive or machine printed variable writing on the document with the writing characteristics that are deemed valid according to the agency that issues the document. All the analyses are conducted on the document images. Besides the business or personal checks as mentioned above, other applicable negotiable documents include money orders and giros, which are check-like negotiable documents commonly used in many European countries.

Public check validation profiles, or more generally, public document validation profiles, can be used not only for determining whether a negotiable document is a valid one or potentially a fraudulent one but also for validating whether the document is fully negotiable. In this case, the profiles are used to verify whether all data required for negotiability are present and readable on the document. For business or personal checks, there is an ANSI standard (ANS X9.100-180-2005, Specifications for Electronic Exchange of Check and Image Data) that specifies what fields must be present and readable for a check to be negotiable. In some embodiments, the negotiability and fraud analyses are conducted at the same time and by the same institution. In some other embodiments, the two analyses are conducted separately by two different institutions.

For example, one institution is responsible for the negotiability analysis and another one for the fraud analysis. The outcome of the negotiability analysis is the determination of whether all the required fields for negotiability are present and readable on the document image being examined. In contrast, the fraud analysis goes beyond negotiability analysis to determine whether all the fields are located in the predefined position in the document image and have the predefined writings matching the characteristics as embodied by the profile.

In either analysis, the software first extracts a feature set from a new document image under examination. The extracted feature set is then compared with the public document validation profile associated with an account. Since the extracted feature set includes only a predetermined set of features characterizing the document image and does not contain any data subject to privacy restrictions or of use to potential fraud perpetrators, it can be transmitted over communication networks with limited bandwidth or even over unsecured networks. In other words, the negotiability and the fraud detection analyses are enabled by the extracted feature sets to be conducted remotely without requiring the transmission of any full document image.

Although a public document validation profile is typically defined as being associated with a specific bank account, the same principle works in the case where there is no specific bank account available. For example, a check cashing service often cashes payroll checks for many people who do not have bank accounts. In this event, two separate public validation profiles are required to validate the check and detect potential check fraud, one account profile to validate the check and its maker being presented to the check cashing service and a payee profile to validate the individual presenting the check. In some embodiments, the payee profile contains the characteristics of the payee name and address on the check as well as that individual's writing characteristics found in the check endorsement 185.

An example illustrating the operation of one embodiment of the present invention is as follows:

1. Start-Up

Figure 9:
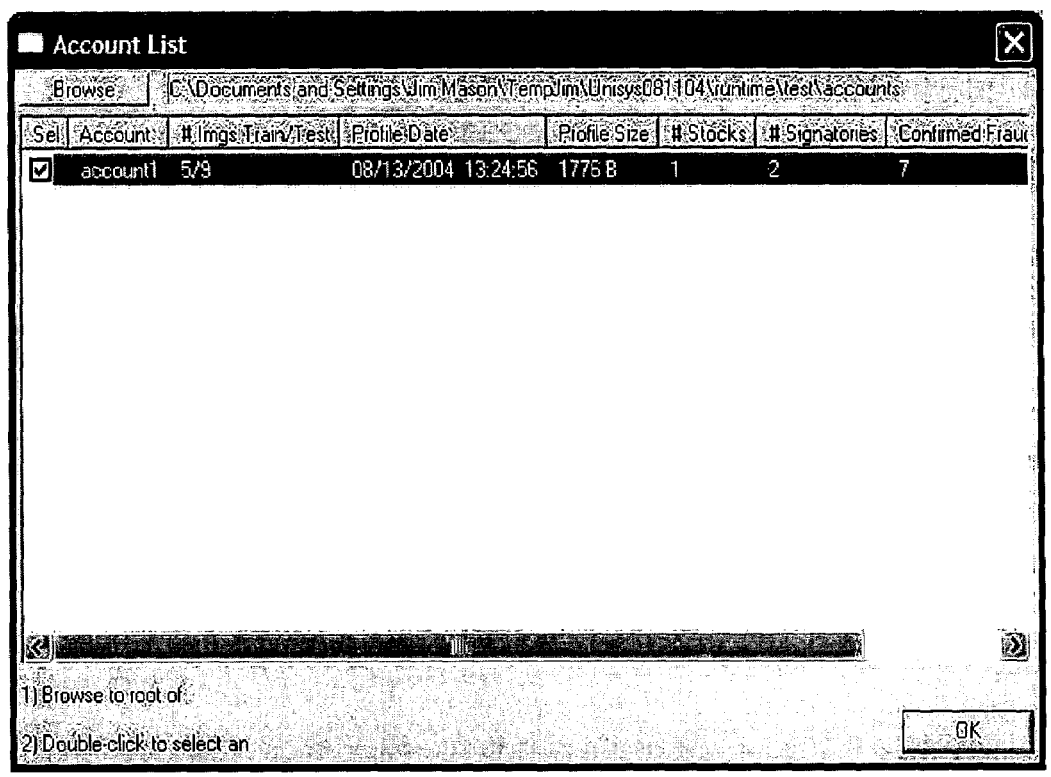
FIG. 9 is a screen shot of a typical account list screen of one embodiment of the present invention.

FIG. 9 is a screenshot of an account list screen displayed to a user of a system according to one embodiment of the present invention at startup. This screen displays a list of all accounts in the /runtime/test/accounts directory. In this case, there is only one account named "account1". The entry "5/9" indicates that there are five check images in the train set and nine check images in the test set associated with this account. A train set consists of one or more check images known to be valid. The software extracts feature sets from each check image in the train set in order to build a public check validation profile. A test set consists of one or more check images to be validated against the characteristics in the public check validation profile created using the train set.

In the demonstration being described, the test set consists of a mix of images of checks known to be fraudulent and known to be valid. The entry "Aug. 13, 2004 13:24:56" indicates the exact date and time that a profile was generated for this account. The profile size is 1776 bytes. The number of different check stocks in the profile is "1". The number of signatures in the profile is "2". The number of confirmed fraud items in the test set is "7", which is supplied by an account1_fraud.dat file associated with the account "account1".

2. Select an Account

Figure 10:
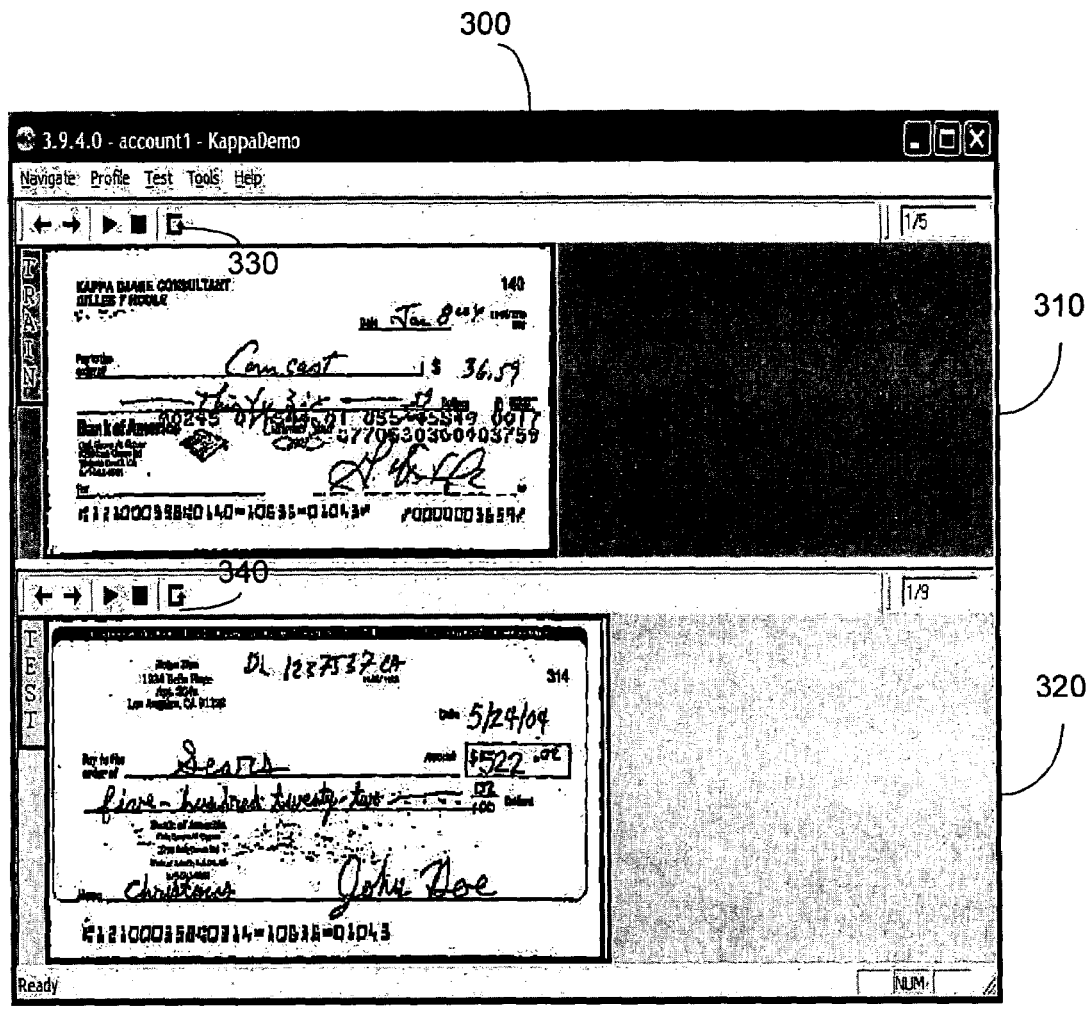
FIG. 10 is a screenshot of a main screen corresponding to one account.

FIG. 10 is a screenshot of a main screen 300 corresponding to account "account1" which is brought up by checking the checkbox next to the name and then clicking the OK button in FIG. 9.

The main screen in FIG. 10 includes two panes, an upper pane 310, and a lower pane 320. An image of the first check in the train set is displayed in the upper pane 310, and an image of the first check in the test set is displayed in the lower pane 320. The strings at upper right corner of each pane, "1/5" in pane 310 and "1/9" in pane 320, indicate the number of images being displayed and the total number of images in each set.

The arrow buttons ← and → within each pane 310, 320 allow the user to manually cycle through the images in each set. The ►button within each pane 310, 320 starts the profile building process. As each image is processed, it is briefly displayed in the pane for the currently running process. The user can stop the process at any time by pressing the corresponding ■ button within each pane 310, 320. The user can instruct the system to cycle through check images within each pane at a predetermined timing interval by clicking the corresponding circular buttons 330 or 340. To stop the cycling, the user just needs to click the circular button 330 or 340 again. The cycling process is used by someone to visually examine the check images included in the train and test sets before any process is completed.

When the ►button within the upper pane 310 is pressed, the software processes the check images in the train set and generates three profiles, a public check validation profile, an internal detection profile, and a review profile.

When the ►button within the lower pane 320 is clicked, the software processes the check images in the test set against the public check validation profile generated previously. A feature set is extracted from each check image in the test set and compared with the features embedded in the profile, and a comparison result is produced for each check image in the test set.

The Menu items (Navigate, Profile, Test, Tools, Help) at the top of screen 300 duplicate the functionality provided by the buttons in each pane and also provide some additional capabilities that are explained in the menu item selections. For instance, Navigate provides a way to go back to the Account List to select another account. There is a brief Guide to the button functions under Help.

3. Account Profile Creation

The user starts the profile building process by clicking the ►button in the upper pane 310 of FIG. 10. Each image in the training set is displayed as it is processed. At the completion of the training process, a newly-created profile appears (as shown in FIG. 11).

Figure 11:
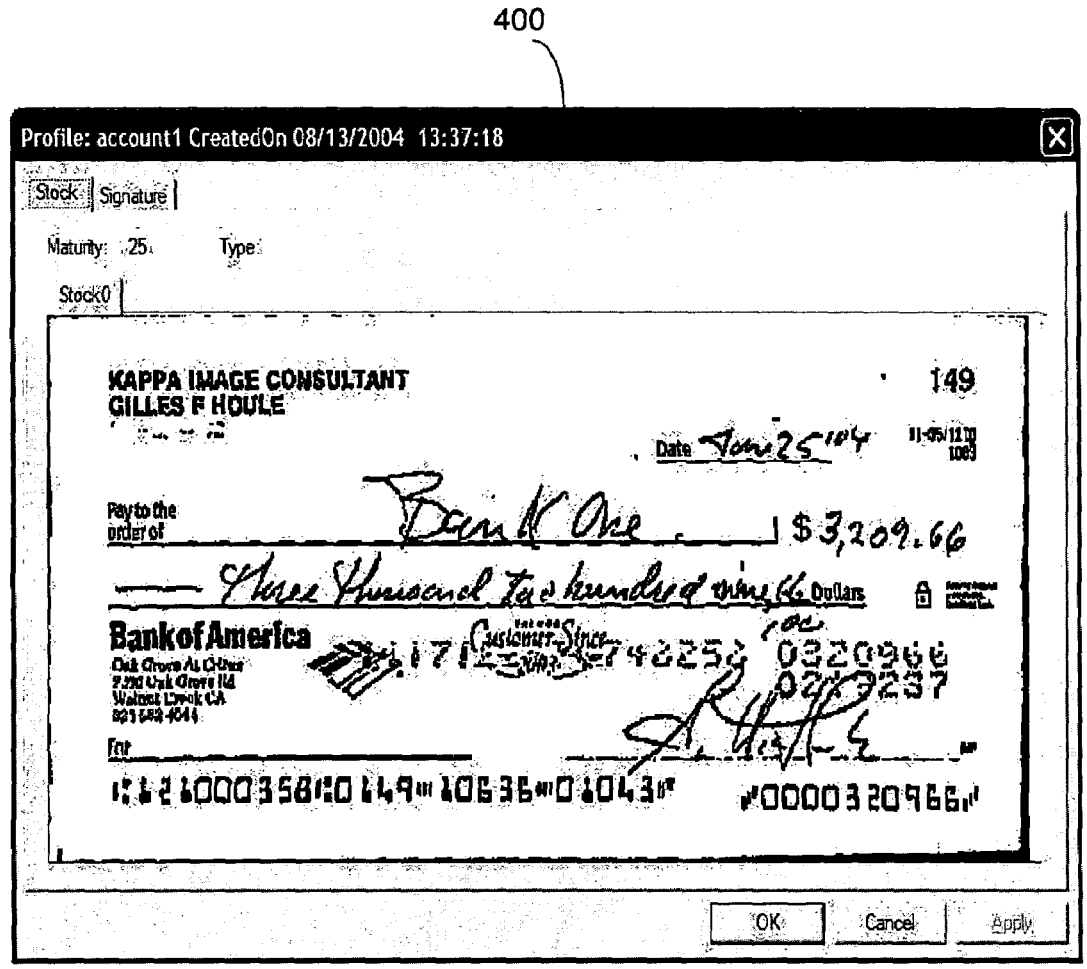
FIG. 11 is a screenshot of a newly created profile.

The profile screen 400 in FIG. 11 depicts the contents of the review profile the system created. During profile creation, the system creates two profiles, an internal profile used during fraud detection operations and a review profile used by fraud analysts in reviewing any suspects found on an account. The review profile contains viewable parts of the training set that would help a fraud analyst to compare a suspect check to features typical for an account. In the example, the check image shown is representative of the checks included in the set for the account "account1". If more than one check stock is in the training set, the review profile would contain a representative image for each stock.

Figure 12:
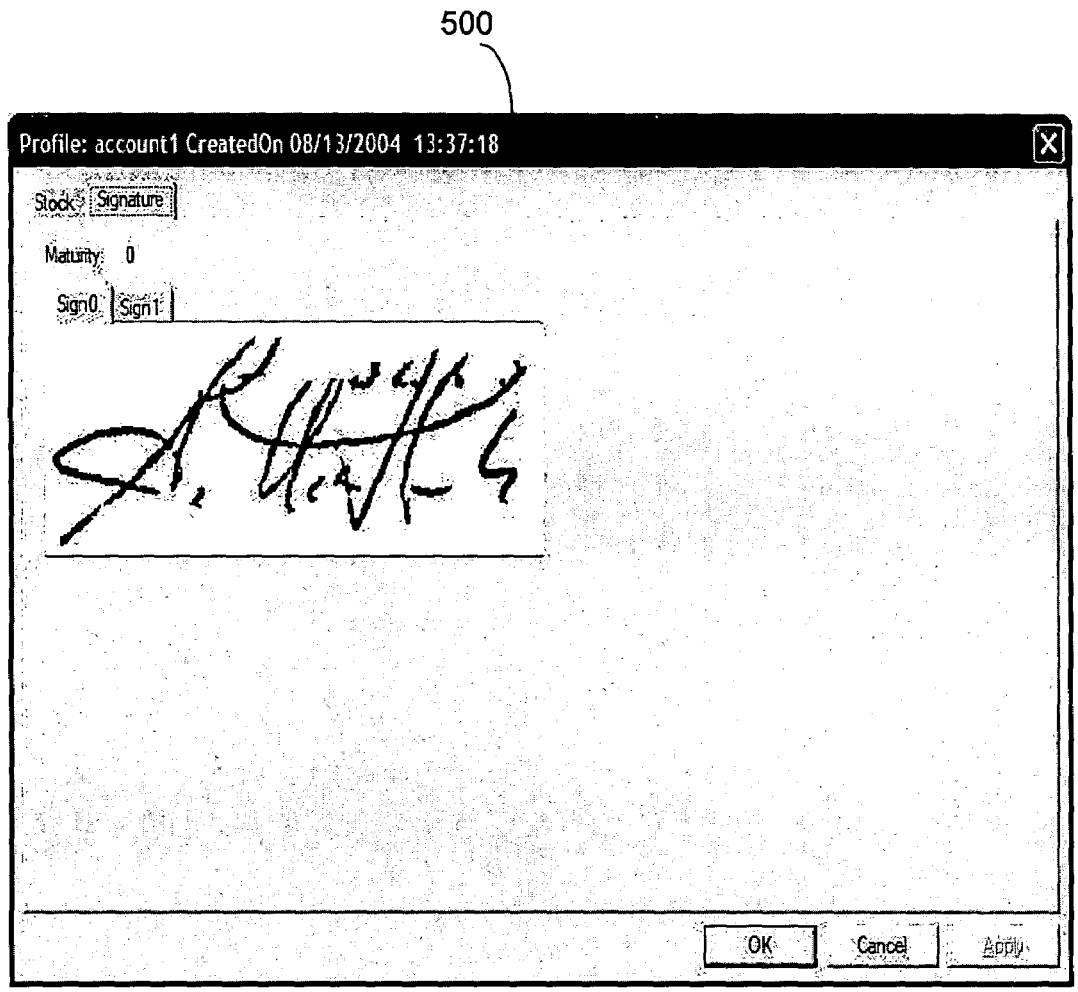
FIG. 12 is a screenshot of signatures on the check.

FIG. 12 is a screenshot of signatures on the check when the user clicks the "Signature" tab for the review profile. Two signatures "Sign0" and "Sign1" respectively were added to the review profile. Generally, automated image analysis only identifies check fraud suspects and does determine whether a check image that does not match a public check validation profile actually corresponds to a fraudulent check. Therefore, human review is often invoked to determine whether the suspected check is indeed fraudulent or not. In some embodiments, this human review is performed by a reviewer to visually compare the image of the suspect document to the valid images in the review profile. For example, the software identifies those check images including signatures that are sufficiently different to be deemed as signature variants. The reviewer then visually examines the signature portions on the suspected check images to determine the validity of the signatures.

Figure 13:
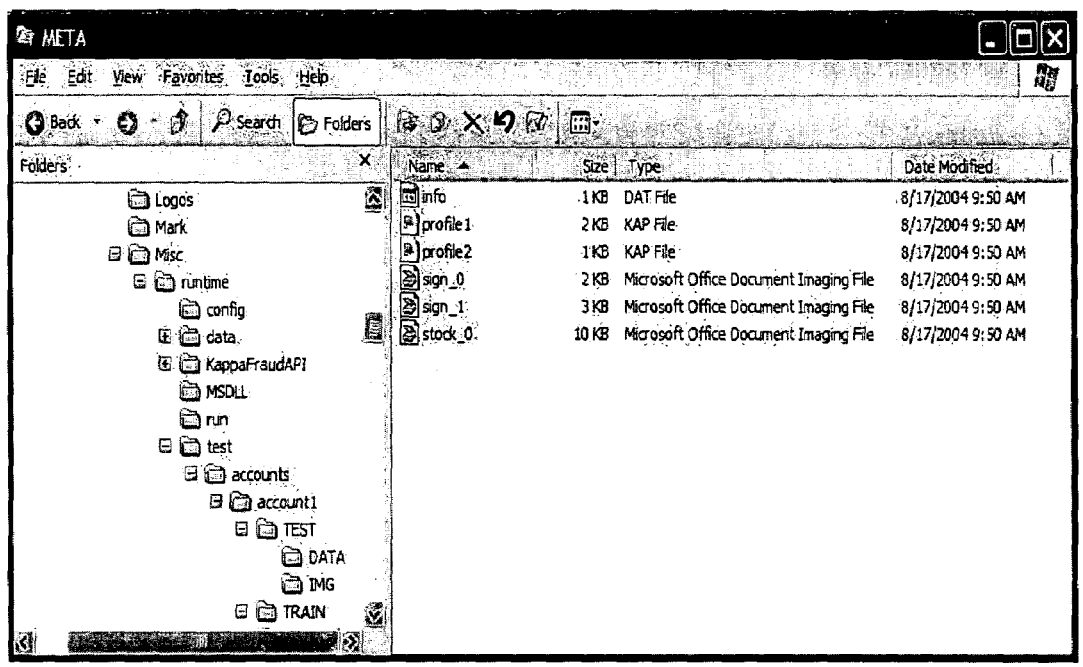
FIG. 13 is a screenshot of profile files associated with an account.

FIG. 13 is a screenshot of profile files associated with the account "account1 " stored in a runtime/test/accounts/account1/TRAIN/META directory. Profile1.kap is the system's version of the public check validation profile that can be used by anyone to validate a check drawn on the account. Profile1.kap contains no account information subject to privacy laws and regulations, and the mathematical representations of the check characteristics typical for the account cannot be used by anyone to create a fraudulent check. Profile2.kap contains information about the account that is subject to privacy laws and regulations and is, therefore, used only by the account holding bank. It is not made available to other banks or third parties. Profile1.kap and profile2.kap together constitute the system's version of the internal check validation profile.

The directory also contains an info.dat file that contains the number of different stocks found in the set (NumStock 1), the maturity value for each stock found (Stock 0 maturity: 25), and the number of signatures included in the review profile (NumSign 2). The maturity of the stock increases as the number of images in the training set increases. In some embodiments, a mature profile has a maturity value of 100. The maturity value of a profile is generated through a statistical calculation. The statistical calculation looks for significant differences in the extracted feature sets of check images used for creating and updating the profile. As more and more checks are examined, the number of significant differences declines and the maturity of the profile increases, indicating that the profile contains more features for the range of valid differences.

The remaining files of the directory are the representative check stock (stock_0) and signature images (sign_0, sign_1) in the review profile. These are also for use by accountholding bank personnel in the process of reviewing suspect checks.

4. Fraud Detection

The user starts the fraud detection process by clicking the ►button in the lower pane 320 of FIG. 10. Each image in the test set is displayed as it is processed. In the end, a summary of test results for each image after fraud detection testing is generated. The test result includes different levels of fraud detection, e.g., "counterfeit", "counterfeit+signature" and "comprehensive", etc.

"Counterfeit" limits the analysis to a comparison between the features of the preprinted elements in the check image and the corresponding features in the public check validation profile. Preprinted elements include the location, format and fonts of all standard printing as well as the location and format of all graphic elements such as bank logos. "Counterfeit+Signature" deepens the analysis by including a comparison of signature features.

As suggested by its name, "comprehensive" is the most thorough analysis. It compares the writing features of all variable data fields in the check image, such as the legal amount, the courtesy (numeric amount), etc., with the features in the profile.

5. Reviewing Fraud Detection Results

Figure 14:
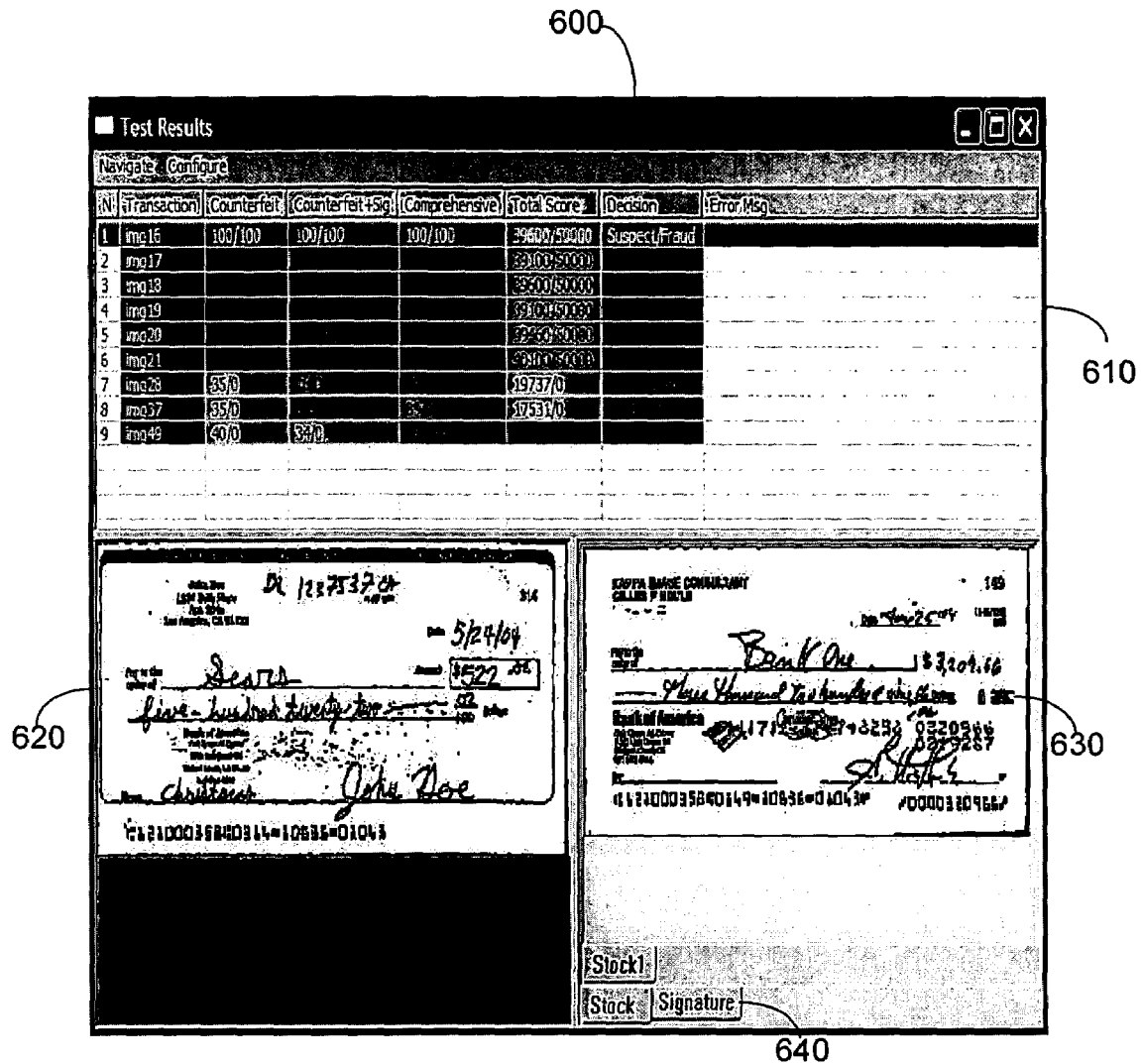
FIG. 14 is a screenshot illustrating test results associated with an account at the completion of the testing process.

FIG. 14 is a screenshot illustrating test results associated with account "account1" at the completion of the testing process. The test results screen 600 includes three panes 610, 620 and 630. The results for each check in the test set are displayed in the upper pane. Each pair of values located in a cell and separated by a slash sign represents the analysis result at a particular level of fraud detection. The first value to the left of the slash sign is the result produced by the fraud detection software, indicating whether the check is fraudulent. For example, a value of 100 indicates that the check is fraud and a value of 0 indicates that the check is valid. Since the account "account1" is a sample account, the second value to the right of the slash sign is the actual status of each check image, serving as a reference. For example, the comparison result of the check image "img21" at the "counterfeit" level is "100/100". In other words, the fraud detection software determines that the check is a fraudulent suspect. This conclusion is consistent with the actual status of the check, because it is indeed a fraud check.

Checks can be highlighted and displayed using the keyboard arrow keys. The columns in pane 610 are:

| Column Heading | Explanation |
| --- | --- |
| N | Sequence location of item in test set |
| Transaction | Image identifier |
| Counterfeit | Counterfeit score (0 . . . 100 where 100 = definitely not matched to stocks in the profile) |
| Counterfeit + Sig | Signature score (0 . . . 100 where 100 = definitely not matched to signatures in the profile) |
| Comprehensive | Other writing score (0 . . . 100 where 100 = definitely not match to writing characteristics in profile) |
| Total Score | Weighted score of all factors (0 . . . 50000 where scores above 20000 indicate a suspect item) |
| Decision | The decision reached during testing versus the "truth" value for the check. Possible results are:<br>Suspect/Fraud - check is a "Suspect" and actually "Fraud"<br>Suspect/Good - check is a "Suspect" and actually "Good"<br>Accept/Fraud - check is "Accept"ed as valid but is actually "Fraud"<br>Accept/Good - check is "Accept"ed as valid and is actually "Good" |
| Error Msg | This field will contain any error messages generated while processing the item such as "Poor Quality Image" if the system cannot process an image due to image quality problems |

In some embodiments, different colors are assigned to different types of decision results. For example, red in the display indicates a suspicious value, yellow indicates a questionable value, and green indicates a good value.

When the user selects a check in the test results list in the upper pane 610, the corresponding check image is displayed in the lower left-hand pane 620 and the contents of the review profile for the account is displayed in the lower right-hand pane 630. The buttons 640 in the lower right-hand pane 630 allow the display to toggle among the stock image and signature images in the review profile.

6. Excel Results Spreadsheet

Figure 15:
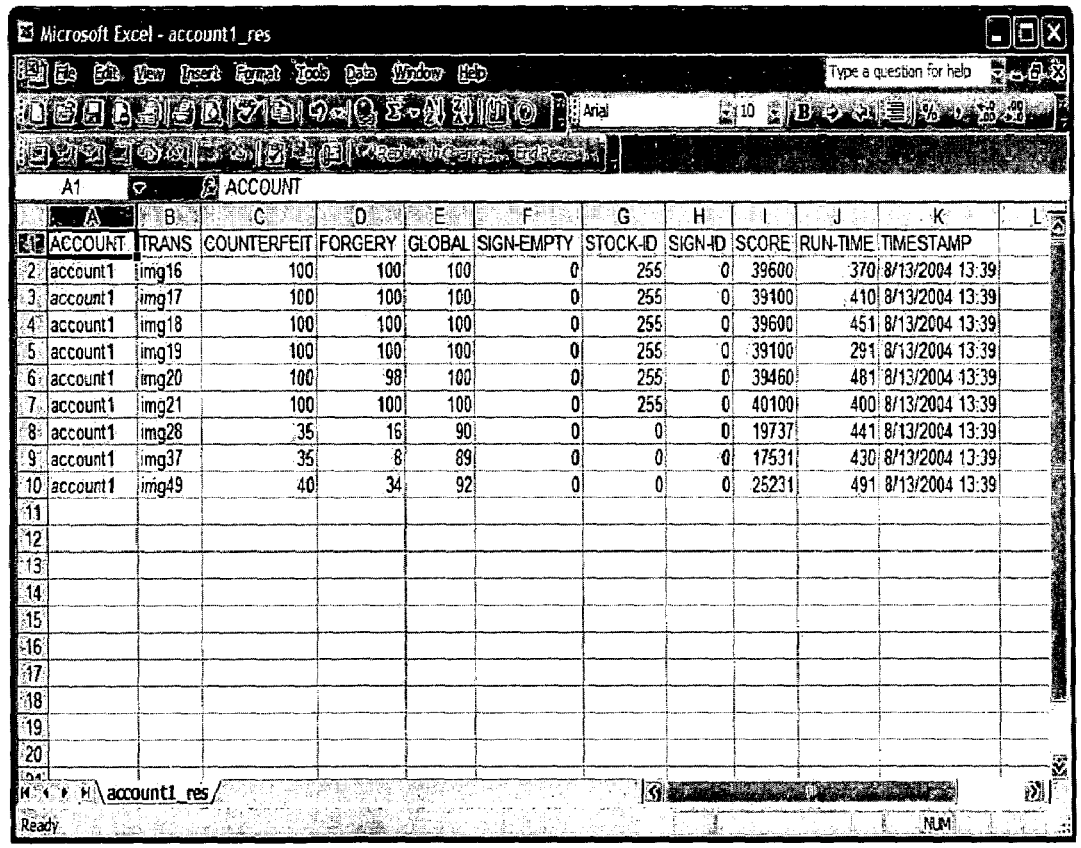
FIG. 15 is a spreadsheet version of the information shown in FIG. 15.

In addition to reviewing the results using the test results display shown in FIG. 14, the system also stores the results in an Excel spreadsheet. This spreadsheet typically looks like the one illustrated in FIG. 15.

The spreadsheet includes the detection results values for each check in the account test set and some additional information. The SIGN-EMPTY field contains a value other than "0" if no signature was detected from the image of the check being analyzed. The STOCK-ID field contains either the identifier for the stock in the profile matching the check (e.g. STOCK-ID=0 means a match to Stock 0 in the profile) or "255" if no match was obtained to any stock in the profile. The RUN-TIME field includes the processing time in milliseconds required to process each check image. The TIMESTAMP field includes the date and time to the nearest minute that the item was processed. It will be understood by one skilled in the art that the test results and other information can be provided in a file format tailored to meet the requirements of a receiving system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of validating a first negotiable document drawn on an account, comprising:
    extracting a set of characteristics from a plurality of negotiable documents that are known to be valid for the account;
    storing a representation of a first subset of the set of characteristics from the plurality of negotiable documents in a public document validation profile associated with the account, wherein the public document validation profile is shared by the financial institution holding the account and at least one other financial institution;
    generating an image of the first negotiable document using an imaging device;
    extracting a plurality of characteristics from the image;
    comparing, using a check validation computer system, the characteristics extracted from the image with at least the representation of the first subset of the set of characteristics to produce a comparison result;
    if said comparison result is negative, comparing the plurality of characteristics extracted from the image with a private document validation profile associated with the account; and
    affirming or negating the first negotiable document's validity based on the comparison result.

2. The computer-implemented method of claim 1, further comprising validating whether the first negotiable document is filly negotiable.

3. The computer-implemented method of claim 1, further comprising:
storing a representation of a second subset of the set of characteristics associated with the plurality of other negotiable documents in the private document validation profile associated with the account, wherein the private document validation profile is available only to the financial institution holding the account.

4. The computer-implemented method of claim 1, wherein comparing the characteristics further comprises:
determining a numeric value indicating a level of match between the characteristics extracted from the image and corresponding characteristics extracted from the plurality of other negotiable documents.

5. The computer-implemented method of claim 1, wherein the set of characteristics include one or more characteristics associated with one or more foreground information fields on the negotiable documents;
wherein the one or more characteristics include: a size of the information field, a
shape of the information field, an absolute location of the information field, a location of the information field relative to other information fields, and content of the information; and
wherein the foreground information fields include: one or more fields identifying a payer, one or more fields identifying a financial institution holding the account, a magnetic ink character recognition field, a document number field, one or more fields identifying a payee, a legal amount field, a courtesy amount field, a date field, a signature field and a memo field.

6. A computer-implemented method of validating a first negotiable document drawn on an account, comprising:
generating an image of the first negotiable document using an imaging device;
extracting a plurality of characteristics from the image;
comparing, using a check validation computer system, the plurality of characteristics extracted from the image with characteristics extracted from a plurality of negotiable documents that are known to be valid for the account; and
affirming or negating the first negotiable document's validity based on the comparison,
wherein the extracted characteristics include one or more characteristics associated with one or more foreground information fields on the first negotiable document,
wherein the characteristics include: a size of the information field, a shape of the information field, an absolute location of the information field, and a location of the information field relative to other information fields, and
wherein the foreground information fields include: one or more fields identifying a payer, one or more fields identifying a financial institution holding the account, a magnetic ink character recognition field, a document number field, one or more fields identifying a payee, a legal amount field, a courtesy amount field, a date field, a signature field and a memo field.

7. The computer-implemented method of claim 6, further comprising validating whether the first negotiable document is fully negotiable.

8. The computer-implemented method of claim 6, wherein a representation of a first subset of characteristics extracted from the plurality of other negotiable documents is stored in a public document validation profile associated with the account, wherein the public document validation profile is shared by the financial institution holding the account and at least one other financial institution, further comprising:
comparing the characteristics extracted from the image with the first subset of characteristics extracted from the plurality of other negotiable documents to produce a comparison result.

9. The computer-implemented method of claim 8, wherein a representation of a second subset of characteristics extracted from the plurality of other negotiable documents is stored in a private document validation profile associated with the account, wherein the private document validation profile is available only to the financial institution holding the account.

10. The computer-implemented method of claim 8, further comprising:
if said comparison result is negative, comparing the plurality of characteristics extracted from the image with the private document validation profile associated with the account; and
affirming or negating the first negotiable document's validity in accordance with said comparison result.

11. The computer-implemented method of claim 6, wherein comparing further comprises:
determining a numeric value indicating a level of match between the characteristics extracted from the image and characteristics extracted from the plurality of other negotiable documents.

12. A system for detecting fraudulent negotiable documents drawn on an account, comprising:
an imaging device for capturing an image of a first negotiable document; and
a negotiable document validation module coupled to the imaging device, the negotiable document validation module further including:
an extraction module configured to extract a plurality of characteristics from the captured image of the first negotiable document,
a comparison module configured to compare the characteristics extracted from the image with characteristics extracted from plurality of negotiable documents that are known to be valid for the account, and
a validation module configured to affirm or negate the first negotiable document's validity in accordance with said comparison result,
wherein the extracted characteristics include one or more characteristics associated with one or more foreground information fields on the first negotiable document,
wherein the characteristics include: a size of the information field, a shape of the information field, an absolute location of the information field, and a location of the information field relative to other information fields, and
wherein the foreground information fields include: one or more fields identifying a payer, one or more fields identifying a financial institution holding the account, a magnetic ink character recognition field, a document number field, one or more fields identifying a payee, a legal amount field, a courtesy amount field, a date field, a signature field and a memo field.

13. The system of claim 12, wherein a representation of a first subset of characteristics extracted from the plurality of other negotiable documents is stored in a public document validation profile associated with the account, wherein the public document validation profile is shared by the financial institution holding the account and at least one other financial institution, and wherein the comparison module is configured to compare the characteristics extracted from the image with characteristics in the first subset of characteristics extracted from the plurality of other negotiable documents to produce a comparison result.

14. The system of claim 13, wherein a representation of a second subset of characteristics extracted from the plurality of other negotiable documents is stored in a private document validation profile associated with the account, wherein the private document validation profile is available only to the financial institution holding the account.

15. The system of claim 14, wherein if said comparison result is negative, the comparison module is configured to compare the plurality of characteristics extracted from the image with characteristics in the private document validation profile associated with the account.

16. A computer-implemented method of creating one or more validation profiles for a financial account, comprising:
   identifying a plurality of negotiable documents that are known to be valid for the financial account;
   generating one or more respective images for one or more of the plurality of negotiable documents using an imaging device;
   extracting a set of characteristics from the plurality of document images; and
   storing a representation of a first subset of the set of characteristics in a public document validation profile associated with the financial account, wherein the public document validation profile is shared by the financial institution holding the account and at least one other financial institution,
   wherein the set of characteristics include one or more characteristics associated with one or more foreground information fields on a negotiable document,
   wherein the characteristics include: a size of the information field, a shape of the information field, an absolute location of the information field, a location of the information field relative to other information fields, and content of the information, and
   wherein the foreground information fields include: one or more fields identifying a payer, one or more fields identifying a financial institution holding the account, a magnetic ink character recognition field, a document number field, one or more fields identifying a payee a legal amount field, a courtesy amount field, a date field, a signature field and a memo field.

17. The computer-implemented method of claim 16, further comprising:
   storing a representation of a second subset of the set of characteristics in a private document validation profile with the account, wherein the private document validation profile is available only to the financial institution holding the account.

18. A computer-implemented method of validating a first negotiable document requesting or ordering transfer of value from an account, comprising:
   accessing a public document validation profile,
      wherein the public document validation profile includes a mathematical representation of a set characteristics extracted from a plurality of negotiable documents that are known to be valid for the account,
      wherein the set of characteristics include one or more characteristics associated with one or more foreground information fields on the first negotiable document,
      wherein the foreground characteristics include: a size of the information field, a shape of the information field, an absolute location of the information field, and a location of the information field relative to other information fields, and
      wherein the foreground information fields include: one or more fields identifying a payer, one or more fields identifying a financial institution holding the account, a magnetic ink character recognition field, a document number field, one or more fields identifying a payee, a legal amount field, a courtesy amount field, a date field, a signature field and a memo field;
   obtaining an image of the first negotiable document using an imaging device;
   extracting a plurality of characteristics from the image;
   comparing, using a check validation computer system, the plurality of characteristics with the public document validation profile associated with the account; and
   affirming or negating the first negotiable document's first validity in accordance with said comparison result.

* * * * *